(12) United States Patent
Kim et al.

(10) Patent No.: US 11,985,689 B2
(45) Date of Patent: May 14, 2024

(54) APPARATUS AND METHOD EMPLOYING MULTI-RESOURCE UNIT FOR USER IN A WIRELESS LOCAL AREA NETWORK

(71) Applicant: SAMSUNG ELECTRONICS CO., LTD., Suwon-si (KR)

(72) Inventors: Myeongjin Kim, Seoul (KR); Wook Bong Lee, San Jose, CA (US)

(73) Assignee: SAMSUNG ELECTRONICS CO., LTD., Suowin-si (KR)

( * ) Notice: Subject to any disclaimer, the term of this patent is extended or adjusted under 35 U.S.C. 154(b) by 450 days.

(21) Appl. No.: 17/188,060

(22) Filed: Mar. 1, 2021

(65) Prior Publication Data
US 2021/0282146 A1 Sep. 9, 2021

Related U.S. Application Data

(60) Provisional application No. 62/984,556, filed on Mar. 3, 2020.

(30) Foreign Application Priority Data

Jun. 8, 2020 (KR) ........................ 10-2020-0069199

(51) Int. Cl.
*H04W 72/53* (2023.01)
*H04W 72/0453* (2023.01)
(Continued)

(52) U.S. Cl.
CPC ....... *H04W 72/53* (2023.01); *H04W 72/0453* (2013.01); *H04W 72/23* (2023.01); *H04W 84/12* (2013.01)

(58) Field of Classification Search
None
See application file for complete search history.

(56) References Cited

U.S. PATENT DOCUMENTS 9,722,740 B2 8/2017 Suh et al.
10,014,992 B2 7/2018 Sun et al.
(Continued)

FOREIGN PATENT DOCUMENTS

KR 10-2016-0130944 11/2016
KR 10-2017-0016978 2/2017
(Continued)

OTHER PUBLICATIONS

US 10,506,597 B2, 12/2019, Gan et al. (withdrawn)
(Continued)

*Primary Examiner* — Srinivasa R Reddivalam
(74) *Attorney, Agent, or Firm* — F. CHAU & ASSOCIATES, LLC

(57) ABSTRACT

An apparatus and a method for allocating a multiple resource unit (RU) for a user in a wireless local area network (WLAN) system are provided. A transmission device of the WLAN system includes a transceiver that generates a physical layer convergence protocol (PLCP) protocol data unit (PPDU) including a preamble and a payload and transmitting the generated PPDU to at least one receiving device and a processor controlling the transceiver. The preamble includes a plurality of training fields and a plurality of signaling fields. Resource unit (RU) allocation information on the at least one receiving device is included in one of the plurality of signaling fields. The RU allocation information includes a first subfield indicating an arrangement of RUs in a frequency domain corresponding to the PPDU and a second subfield indicating a portion of the RUs to be combined to form a multiple RU.

20 Claims, 26 Drawing Sheets

(51) Int. Cl.
*H04W 72/23* (2023.01)
*H04W 84/12* (2009.01)

(56) References Cited

U.S. PATENT DOCUMENTS

| | | | |
|---|---|---|---|
| 10,111,270 B2* | 10/2018 | Choi | H04L 5/00 |
| 10,356,777 B2 | 7/2019 | Banerjea et al. | |
| 10,375,683 B2 | 8/2019 | Verma et al. | |
| 10,505,691 B2 | 12/2019 | Choi et al. | |
| 10,582,025 B2 | 3/2020 | Josiam et al. | |
| 2017/0041929 A1 | 2/2017 | Noh et al. | |
| 2017/0332385 A1 | 11/2017 | Shirali et al. | |
| 2019/0007977 A1 | 1/2019 | Asterjadhi et al. | |
| 2019/0029041 A1 | 1/2019 | Tomeba et al. | |
| 2019/0045451 A1* | 2/2019 | Huang | H04L 5/0053 |
| 2019/0238288 A1* | 8/2019 | Liu | H04L 5/0037 |
| 2020/0092881 A1 | 3/2020 | Nezou et al. | |
| 2021/0212035 A1* | 7/2021 | Son | H04W 72/23 |
| 2021/0274484 A1* | 9/2021 | Park | H04W 72/0453 |

FOREIGN PATENT DOCUMENTS

| | | |
|---|---|---|
| KR | 10-2019-0129044 | 11/2019 |
| WO | 2017030404 | 2/2017 |

OTHER PUBLICATIONS

European Search Report dated Jun. 29, 2021 in corresponding European Patent Application No. 21157868.7 (13 pages).
Huang, et al., (PANASONIC): "Discussion on EHT PPDU formats", IEEE Draft; 11-20-0031-02-00BE-Considerations-on-EHT-PPDU-Formats, IEEE-SA Mentor, Piscataway, NJ USA, vol. 802.11 EHT; 802.11be, No. 2 Jan. 16, 2020 (Jan. 16, 2020), pp. 1-11, XP068165395, Retrieved from the Internet: URL : https : //men, 11 pages.
Huang, et al., (PANASONIC): "Signaling Support for Multi-RU Assignment", IEEE Draft; 11-19-1868-02.00BE. Signaling-Support-for-Multi-RU-Assignment, IEEE-SA Mentor, Piscataway, NJ USA, vol. 802.11 EHT; 802.11be, No. 2 Jan. 8, 2020 (Jan. 8, 2020), pp. 1-12, XP068165022., 12 pages.
Au, (HUAWEI): "Specification Framework for TGbe", IEEE Draft; 11-19-1262-08-00BE-Specification-Framework-for-TGBE, IEEE-SA Mentor, Piscataway, NJ USA, vol. 802.11 EHT; 802.Ube, No. 8 Feb. 12, 2020 (Feb. 12, 2020), pp. 1-20, XP068165651, Retrieved from the Internet: URL:https://mentor.ieee.or, 20 pages.
European Office Action dated Feb. 27, 2023, in corresponding European Patent Application No. 21157868.7 (6 pages).

* cited by examiner

FIG. 8

| L-STF | L-LTF | L-SIG | RL-SIG | HE-SIG-A | HE-SIG-B | HE-STF | HE-LTF | Data | PE | FIRST FREQUENCY BAND — 781 |
| --- | --- | --- | --- | --- | --- | --- | --- | --- | --- | --- |
| L-STF | L-LTF | L-SIG | RL-SIG | HE-SIG-A | HE-SIG-B | HE-STF | HE-LTF | Data | PE | SECOND FREQUENCY BAND — 782 |
| L-STF | L-LTF | L-SIG | RL-SIG | HE-SIG-A | HE-SIG-B | HE-STF | HE-LTF | Data | PE | THIRD FREQUENCY BAND — 783 |
| L-STF | L-LTF | L-SIG | RL-SIG | HE-SIG-A | HE-SIG-B | HE-STF | HE-LTF | Data | PE | FOURTH FREQUENCY BAND — 784 |

FIG. 11

| STA-ID | Spatial Configuration | MCS | Reserved | Coding |

| RU Allocation subfield (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 0 (00000000) | 26 | 26 | 26 | 26 | 26 | 26 | 26 | 26 | 26 | 1 |
| 1 (00000001) | 26 | 26 | 26 | 26 | 26 | 26 | 26 | 52 | | 1 |
| 2 (00000010) | 26 | 26 | 26 | 26 | 26 | 52 | | 26 | 26 | 1 |
| 3 (00000011) | 26 | 26 | 26 | 26 | 26 | 52 | | 52 | | 1 |
| 4 (00000100) | 26 | 26 | 52 | | 26 | 26 | 26 | 26 | 26 | 1 |
| 5 (00000101) | 26 | 26 | 52 | | 26 | 26 | 26 | 52 | | 1 |
| 6 (00000110) | 26 | 26 | 52 | | 26 | 52 | | 26 | 26 | 1 |
| 7 (00000111) | 26 | 26 | 52 | | 26 | 52 | | 52 | | 1 |
| 8 (00001000) | 52 | | 26 | 26 | 26 | 26 | 26 | 26 | 26 | 1 |
| 9 (00001001) | 52 | | 26 | 26 | 26 | 26 | 26 | 52 | | 1 |
| 10 (00001010) | 52 | | 26 | 26 | 26 | 52 | | 26 | 26 | 1 |
| 11 (00001011) | 52 | | 26 | 26 | 26 | 52 | | 52 | | 1 |
| ... | | | | | | | | | | |
| 96-111 (0110$y_1 y_0 z_1 z_0$) | 106 | | | | - | | 106 | | | 16 |
| 112 (01110000) | 52 | | 52 | | - | | 52 | | 52 | 1 |
| 113 (01110001) | 242-tone RU empty (with zero users) | | | | | | | | | 1 |
| 114 (01110010) | 484-tone RU ; contributes zero User fields to the User specific field in the same HE-SIG-B content channel as this RU Allocation subfield | | | | | | | | | 1 |
| 115 (01110011) | 996-tone RU ; contributes zero User fields to the User specific field in the same HE-SIG-B content channel as this RU Allocation subfield | | | | | | | | | 1 |
| 116-119 (011101$x_1 x_0$) | Reserved | | | | | | | | | 4 |
| 120-127 (0111$1 y_2 y_1 y_0$) | Reserved | | | | | | | | | 8 |
| 128-191 (10$y_2 y_1 y_0 z_2 z_1 z_0$) | 106 | | | 26 | | 106 | | | | 64 |
| 192-199 (11000$y_2 y_1 y_0$) | 242 | | | | | | | | | 8 |
| 200-207 (11001$y_2 y_1 y_0$) | 484 | | | | | | | | | 8 |
| 208-215 (11010$y_2 y_1 y_0$) | 996 | | | | | | | | | 8 |
| 216-223 (11011$y_2 y_1 y_0$) | Reserved | | | | | | | | | 8 |
| 224-255 (111$x_4 x_3 x_2 x_1 x_0$) | Reserved | | | | | | | | | 32 |

FIG. 21

| RU Allocation subfield (B7 B6 B5 B4 B3 B2 B1 B0) | Additional RU Allocation subfield (B1 B0) | #1 | #2 | #3 | #4 | #5 | #6 | #7 | #8 | #9 | Number of entries |
|---|---|---|---|---|---|---|---|---|---|---|---|
| 0 | 00 | 26 | 26 | 26 | 26 | 26 | 26 | 26 | 26 | 26 | 1 |
|   | 01–11 | Reserved | | | | | | | | | 3 |
| 1 | 00 | 26 | 26 | 26 | 26 | 26 | 26 | 26 | 52 | | 1 |
|   | 01–11 | Reserved | | | | | | | | | 3 |
| 2 | 00 | 26 | 26 | 26 | 26 | 26 | 52 | 26 | 26 | | 1 |
|   | 01 | 26 | 26 | 26 | 26 | 26 | 52+26 multi-RU | | 26 | | 1 |
|   | 10–11 | Reserved | | | | | | | | | 2 |
| 3 | 00 | 26 | 26 | 26 | 26 | 26 | 52 | 52 | | | 1 |
|   | 01–11 | Reserved | | | | | | | | | 3 |
| 4 | 00 | 26 | 26 | 52 | 26 | 26 | 26 | 26 | 26 | | 1 |
|   | 01 | 26 | 26 + 52 multi-RU | | 26 | 26 | 26 | 26 | 26 | | 1 |
|   | 10–11 | Reserved | | | | | | | | | 2 |
| 5 | 00 | 26 | 26 | 52 | 26 | 26 | 26 | 52 | | | 1 |
|   | 01 | 26 | 26 + 52 multi-RU | | 26 | 26 | 26 | 52 | | | 1 |
|   | 10–11 | Reserved | | | | | | | | | 2 |
| 6 | 00 | 26 | 26 | 52 | 26 | 52 | 26 | 26 | | | 1 |
|   | 01 | 26 | 26 + 52 multi-RU | | 26 | 52 | 26 | 26 | | | 1 |
|   | 10 | 26 | 26 | 52 | 26 | 52+26 multi-RU | | 26 | | | 1 |
|   | 11 | 26 | 26 + 52 multi-RU | | 26 | 52+26 multi-RU | | 26 | | | 1 |
| 7 | 00 | 26 | 26 | 52 | 26 | 52 | 52 | | | | 1 |
|   | 01 | 26 | 26 + 52 multi-RU | | 26 | 52 | 52 | | | | 1 |
|   | 10–11 | Reserved | | | | | | | | | 2 |
| 8 | 00 | 52 | 26 | 26 | 26 | 26 | 26 | 26 | 26 | | 1 |
|   | 01–11 | Reserved | | | | | | | | | 3 |
| 9 | 00 | 52 | 26 | 26 | 26 | 26 | 26 | 52 | | | 1 |
|   | 01–11 | Reserved | | | | | | | | | 3 |
| 10 | 00 | 52 | 26 | 26 | 26 | 52 | 26 | 26 | | | 1 |
|   | 01 | 52 | 26 | 26 | 26 | 52+26 multi-RU | | 26 | | | 1 |
|   | 10–11 | Reserved | | | | | | | | | 2 |
| 11 | 00 | 52 | 26 | 26 | 26 | 52 | 52 | | | | 1 |
|   | 01–11 | Reserved | | | | | | | | | 3 |
| 12 | 00 | 52 | 52 | 26 | 26 | 26 | 52 | | | | 1 |
|   | 01–11 | Reserved | | | | | | | | | 3 |

FIG. 22

| RU Allocation subfield (B7 B6 B5 B4 B3 B2 B1 B0) | Additional RU Allocation subfield (B1 B0) | #1 | #2 | #3 | #4 | #5 | #6 | #7 | #8 | #9 | Number of entries |
|---|---|---|---|---|---|---|---|---|---|---|---|
| 13 | 00 | 52 | | 52 | | 26 | 26 | 26 | 52 | | 1 |
| | 01-11 | Reserved | | | | | | | | | 3 |
| 14 | 00 | 52 | | 52 | | 26 | 52 | 26 | 26 | | 1 |
| | 01 | 52 | | 52 | | 26 | 52+26 multi-RU | | 26 | | 1 |
| | 10-11 | Reserved | | | | | | | | | 2 |
| 15 | 00 | 52 | | 52 | | 26 | 52 | | 52 | | 1 |
| | 01-11 | Reserved | | | | | | | | | 3 |
| 16-23 (00010y2y1y0) | 0y3 | 52 | | 52 | | - | 106 | | | | 16 |
| | 10-11 | Reserved | | | | | | | | | 16 |
| 24-31 (00011y2y1y0) | 0y3 | 106 | | | | - | 52 | | 52 | | 16 |
| | 10-11 | Reserved | | | | | | | | | 16 |
| 32-39 (00100y2y1y0) | 0y3 | 26 | 26 | 26 | 26 | 26 | 106 | | | | 16 |
| | 1y3 | 26 | 26 | 26 | 26 | 26+106 multi-RU | | | | | 16 |
| 40-47 (00101y2y1y0) | 0y3 | 26 | 26 | 52 | | 26 | 106 | | | | 16 |
| | 1y3 | 26 | 26+52 multi-RU | | | 26 | 106 | | | | 16 |
| 120-127 (01111y2y1y0) | 0y3 | 26 | 26 | 52 | | 26+106 multi-RU | | | | | 16 |
| | 1y3 | 26 | 26+52 multi-RU | | | 26+106 multi-RU | | | | | 16 |
| 48-55 (00110y2y1y0) | 0y3 | 52 | | 26 | 26 | 26 | 106 | | | | 16 |
| | 1y3 | 52 | | 26 | 26 | 26+106 multi-RU | | | | | 16 |
| 56-63 (00111y2y1y0) | 0y3 | 52 | | 52 | | 26 | 106 | | | | 16 |
| | 1y3 | 52 | | 52 | | 26+106 multi-RU | | | | | 16 |
| 64-71 (01000y2y1y0) | 0y3 | 106 | | | 26 | 26 | 26 | 26 | 26 | | 16 |
| | 1y3 | 106+26 multi-RU | | | | 26 | 26 | 26 | 26 | | 16 |
| 72-79 (01001y2y1y0) | 0y3 | 106 | | | 26 | 26 | 26 | 52 | | | 16 |
| | 1y3 | 106+26 multi-RU | | | | 26 | 26 | 52 | | | 16 |
| 80-87 (01010y2y1y0) | 0y3 | 106 | | | 26 | 52 | | 26 | 26 | | 16 |
| | 1y3 | 106+26 multi-RU | | | | 52 | | 26 | 26 | | 16 |
| 216-223 (11011y2y1y0) | 0y3 | 106 | | | 26 | 52+26 multi-RU | | | 26 | | 16 |
| | 1y3 | 106+26 multi-RU | | | | 52+26 multi-RU | | | 26 | | 16 |
| 88-95 (01011y2y1y0) | 0y3 | 106 | | | 26 | 52 | | 52 | | | 16 |
| | 1y3 | 106+26 multi-RU | | | | 52 | | 52 | | | 16 |
| 96-111 (0110y1y0z1z0) | y2z2 | 106 | | | | - | 106 | | | | 64 |

FIG. 23

| RU Allocation subfield (B7 B6 B5 B4 B3 B2 B1 B0) | Additional RU Allocation subfield (B1 B0) | #1 | #2 | #3 | #4 | #5 | #6 | #7 | #8 | #9 | Number of entries |
|---|---|---|---|---|---|---|---|---|---|---|---|
| 112 | 00 | 52 | | 52 | | – | | 52 | | 52 | 1 |
| 112 | 01-11 | Reserved | | | | | | | | | 3 |
| 113 | 00 | 242-tone RU empty (with zero users) | | | | | | | | | 1 |
| 113 | 01-11 | Reserved | | | | | | | | | 3 |
| 114 | 00 | 484-tone RU ; contributes zero User fields to the User specific field in the same HE-SIG-B content channel as this RU Allocation subfield | | | | | | | | | 1 |
| 114 | 01-11 | Reserved | | | | | | | | | 3 |
| 115 | 00 | 996-tone RU ; contributes zero User fields to the User specific field in the same HE-SIG-B content channel as this RU Allocation subfield | | | | | | | | | 1 |
| 115 | 01-11 | Reserved | | | | | | | | | 3 |
| 116 | 00 | RU484+RU242 ; contributes zero User fields to the User specific field in the same HE-SIG-B content channel as this RU Allocation subfield | | | | | | | | | 1 |
| 116 | 01-11 | Reserved | | | | | | | | | 3 |
| 117 | 00 | RU484+RU996 ; contributes zero User fields to the User specific field in the same HE-SIG-B content channel as this RU Allocation subfield | | | | | | | | | 1 |
| 117 | 01-11 | Reserved | | | | | | | | | 3 |
| 118 | 00 | 996+996 ; contributes zero User fields to the User specific field in the same HE-SIG-B content channel as this RU Allocation subfield | | | | | | | | | 1 |
| 118 | 01-11 | Reserved | | | | | | | | | 3 |
| 119 | 00 | 996+996+996 ; contributes zero User fields to the User specific field in the same HE-SIG-B content channel as this RU Allocation subfield | | | | | | | | | 1 |
| 119 | 01-11 | Reserved | | | | | | | | | 3 |
| 120-127 | | See above | | | | | | | | | |
| 128-191 (10y2y1y0z2z1z0) | 00 | 106 | | | | 26 | | | 106 | | 64 |
| 128-191 (10y2y1y0z2z1z0) | 01 | 106+26 multi-RU | | | | | | 106 | | | 64 |
| 128-191 (10y2y1y0z2z1z0) | 10 | 106 | | | | 26+106 multi-RU | | | | | 64 |
| 128-191 (10y2y1y0z2z1z0) | 11 | Reserved | | | | | | | | | 64 |
| 192-199 (11000y2y1y0) | 0y3 | 242 | | | | | | | | | 16 |
| 192-199 (11000y2y1y0) | 1y3 | 996+996 | | | | | | | | | 16 |
| 200-207 (11001y2y1y0) | 0y3 | 484 | | | | | | | | | 16 |
| 200-207 (11001y2y1y0) | 1y3 | 996+996+996 | | | | | | | | | 16 |
| 208-215 (11010y2y1y0) | 0y3 | 996 | | | | | | | | | 16 |
| 208-215 (11010y2y1y0) | 10-11 | Reserved | | | | | | | | | 16 |
| 216-223 | | See above | | | | | | | | | |
| 224-239 (1110y3y2y1y0) | 00 | RU484+RU242; First RU242 is not allocation in [RU242 RU242 RU484] | | | | | | | | | 16 |
| 224-239 (1110y3y2y1y0) | 01 | RU484+RU242; Second RU242 is not allocation in [RU242 RU242 RU484] | | | | | | | | | 16 |
| 224-239 (1110y3y2y1y0) | 10 | RU484+RU242; First RU242 is not allocation in [RU484 RU242 RU242] | | | | | | | | | 16 |
| 224-239 (1110y3y2y1y0) | 11 | RU484+RU242; Second RU242 is not allocation in [RU484 RU242 RU242] | | | | | | | | | 16 |
| 240-255 (1111y3y2y1y0) | 00 | RU484+RU996; First RU484 is not allocation in [RU484 RU484 RU996] | | | | | | | | | 16 |
| 240-255 (1111y3y2y1y0) | 01 | RU484+RU996; Second RU484 is not allocation in [RU484 RU484 RU996] | | | | | | | | | 16 |
| 240-255 (1111y3y2y1y0) | 10 | RU484+RU996; First RU484 is not allocation in [RU996 RU484 RU484] | | | | | | | | | 16 |
| 240-255 (1111y3y2y1y0) | 11 | RU484+RU996; Second RU484 is not allocation in [RU996 RU484 RU484] | | | | | | | | | 16 |

FIG. 24A

| RU Allocation subfield (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 6 | 26 | 26 | 52 | 26 | 52 | 26 | 26 | | | 1 |

FIG. 24B

| RU Allocation subfield (B7 B6 B5 B4 B3 B2 B1 B0) | Additional RU Allocation subfield (B1 B0) | #1 | #2 | #3 | #4 | #5 | #6 | #7 | #8 | #9 | Number of entries |
|---|---|---|---|---|---|---|---|---|---|---|---|
| 6 | 00 | 26 | 26 | 52 | 26 | 52 | 26 | 26 | | | 1 |
| | 01 | 26 | 26+52 multi-RU | | 26 | 52 | 26 | 26 | | | 1 |
| | 10 | 26 | 26 | 52 | 26 | 52+26 multi-RU | | 26 | | | 1 |
| | 11 | 26 | 26+52 multi-RU | | 26 | 52+26 multi-RU | | 26 | | | 1 |

FIG. 25A

| RU Allocation subfield (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 128-191 (10y2y1y0z2z1z0) | 106 | | | | 26 | 106 | | | | 64 |

FIG. 25B

| RU Allocation subfield (B7 B6 B5 B4 B3 B2 B1 B0) | Additional RU Allocation subfield (B1 B0) | #1 | #2 | #3 | #4 | #5 | #6 | #7 | #8 | #9 | Number of entries |
|---|---|---|---|---|---|---|---|---|---|---|---|
| 128-191 (10y2y1y0z2z1z0) | 00 | 106 | | | | 26 | 106 | | | | 64 |
| | 01 | 106+26 multi-RU | | | | | 106 | | | | 64 |
| | 10 | 106 | | | | 26+106 multi-RU | | | | | 64 |
| | 11 | Reserved | | | | | | | | | 64 |

FIG. 26A

| RU Allocation subfield (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 80-87 (01010y2y1y0) | 106 | | | 26 | 52 | | 26 | 26 | | 8 |

FIG. 26B

| RU Allocation subfield (B7 B6 B5 B4 B3 B2 B1 B0) | Additional RU Allocation subfield (B1 B0) | #1 | #2 | #3 | #4 | #5 | #6 | #7 | #8 | #9 | Number of entries |
|---|---|---|---|---|---|---|---|---|---|---|---|
| 80-87 (01010y2y1y0) | 00 | 106 | | | 26 | 52 | | 26 | 26 | | 8 |
| | 01 | 106+26 multi-RU | | | | 52 | | 26 | 26 | | 8 |
| | 10 | 106 | | | 26 | 52+26 multi-RU | | | 26 | | 8 |
| | 11 | 106+26 multi-RU | | | | 52+26 multi-RU | | | 26 | | 8 |

FIG. 26C

| RU Allocation subfield (B8 B7 B6 B5 B4 B3 B2 B1 B0) | Additional RU Allocation subfield (B1 B0) | #1 | #2 | #3 | #4 | #5 | #6 | #7 | #8 | #9 | Number of entries |
|---|---|---|---|---|---|---|---|---|---|---|---|
| 80-95 (01010y3y2y1y0) | 00 | 106 | | | | 26 | 52 | | 26 | 26 | 16 |
| | 01 | 106+26 multi-RU | | | | | 52 | | 26 | 26 | 16 |
| | 10 | 106 | | | | 26 | 52+26 multi-RU | | | 26 | 16 |
| | 11 | 106+26 multi-RU | | | | | 52+26 multi-RU | | | 26 | 16 |

FIG. 26D

| RU Allocation subfield (B7 B6 B5 B4 B3 B2 B1 B0) | Additional RU Allocation subfield (B1 B0) | #1 | #2 | #3 | #4 | #5 | #6 | #7 | #8 | #9 | Number of entries |
|---|---|---|---|---|---|---|---|---|---|---|---|
| 80-87 (01010y2y1y0) | 0y3 | 106 | | | | 26 | 52 | | 26 | 26 | 16 |
| | 1y3 | 106+26 multi-RU | | | | | 52 | | 26 | 26 | 16 |
| 216-223 (11011y2y1y0) | 0y3 | 106 | | | | 26 | 52+26 multi-RU | | | 26 | 16 |
| | 1y3 | 106+26 multi-RU | | | | | 52+26 multi-RU | | | 26 | 16 |

APPARATUS AND METHOD EMPLOYING MULTI-RESOURCE UNIT FOR USER IN A WIRELESS LOCAL AREA NETWORK

CROSS-REFERENCE TO RELATED APPLICATIONS

This application is related to and claims priority under 35 U. S. C. § 119 to U.S. provisional Patent Application No. 62/984,556, filed on Mar. 3, 2020 in the United States Patent and Trademark Office, and Korean Patent Application No. 10-2020-0069199, filed on Jun. 8, 2020, in the Korean Intellectual Property Office, the disclosures of which are incorporated by reference herein in their entireties.

TECHNICAL FIELD

This disclosure relates generally to wireless communications and more particularly to wireless local area network (WLAN) based communications with resource unit (RU) allocation for users.

DISCUSSION OF THE RELATED ART

WLAN is a technology for wirelessly connecting two or more devices to each other, where the devices are situated in a local environment such as a building or campus. A WLAN may operate in an infrastructure mode in which an access point (AP) serves a plurality of user devices such as smartphones and computers, and the AP may serve as a gateway to a remote network such as the Internet. A WLAN may alternatively operate as an ad hoc network between peer devices without an AP. In either case, WLAN utilizes orthogonal frequency division multiplexing (OFDM) technology in which each user device communicates with an AP or another user device using an assigned set of OFDM sub-carriers ("sub-bands") within an overall frequency band of the WLAN.

Currently, most WLAN technology is based on the institute of electrical and electronics engineers (IEEE) 802.11 standard. The IEEE 802.11 standard has been developed into 802.11b, 802.11a, 802.11g, 802.11n, 802.11ac, and 802.11ax versions and may currently support a transmission speed up to 1 Gbyte/s through use of OFDM technology. In version 802.11ac, data may be simultaneously transmitted to a plurality of users through a multi-user multi-input multi-output (MU-MIMO) scheme. However, the WLAN system to which version 802.11ac is applied only permits uplink signals to be sent to an AP from one user device at a time, which may result in communication becoming slow in an area in which users are crowded.

The crowded user problem is addressed in version 802.1 lax (referred to as a high efficiency (HE)), which enables simultaneous uplink communication from multiple user devices to an AP using orthogonal frequency-division multiple access (OFDMA) technology. With OFDMA, user devices are each assigned a Resource Unit (RU), which includes a set of segregated OFDM sub-carriers. The RU is utilized for both downlink and uplink, so that the WLAN system to which 802.1 lax is applied (which also uses MU-MIMO) may effectively support communication in a local area crowded with many users.

Furthermore, in 802.11be (extremely high throughput (EHT)), which is a proposed next generation WLAN standard, a 6 GHz unlicensed frequency band is to be supported, a bandwidth up to 320 MHz is to be used per channel, hybrid automatic repeat and request (HARQ) is to be introduced, and MIMO up to 16×16 is to be supported. Therefore, a next generation WLAN system is expected to effectively support low latency and ultra-fast transmission with performance metrics similar to new radio (NR) 5G technology.

SUMMARY

Embodiments of the inventive concept provide an apparatus and a method for efficiently allocating a multi-resource unit (multi-RU) for a user in a wireless local area network (WLAN) system.

According to an aspect of the inventive concept, there is provided a transmission device of the WLAN system, the transmission device including a transceiver configured to generate a physical layer convergence protocol (PLCP) protocol data unit (PPDU) including a preamble and a payload and to transmit the generated PPDU to at least one receiving device and a processor controlling the transceiver. The preamble includes a plurality of training fields and a plurality of signaling fields. RU allocation information for the at least one receiving device is included in one of the plurality of signaling fields. The RU allocation information includes a first subfield indicating an arrangement of RUs in a frequency domain corresponding to the PPDU and a second subfield indicating a portion of the RUs to be combined to form a multiple RU.

According to an aspect of the inventive concept, there is provided a receiving device of a WLAN system, the receiving device including a transceiver configured to receive a PPDU including a preamble and a payload and decoding the payload based on the preamble and a processor controlling the transceiver. The preamble includes a plurality of training fields and a plurality of signaling fields. RU allocation information for the at least one receiving device is included in one of the plurality of signaling fields. The RU allocation information includes a first subfield indicating an arrangement of RUs in a frequency domain corresponding to the PPDU and a second subfield indicating a portion of the RUs to be combined to form a multiple RU.

According to an aspect of the inventive concept, there is provided a wireless communication method of a WLAN system, in which a transmission device allocates an RU for at least one receiving device, including generating a PPDU including a preamble and a payload and transmitting the generated PPDU to at least one receiving device. The preamble includes a plurality of training fields and a plurality of signaling fields. RU allocation information on the at least one receiving device is included in one of the plurality of signaling fields. The RU allocation information includes a first subfield indicating an arrangement of RUs in a frequency domain corresponding to the PPDU and a second subfield indicating a portion of the RUs to be combined to form a multiple RU.

According to an aspect of the inventive concept, there is provided a wireless communication method of a receiving device receiving an RU from a transmission device in a WLAN system, the wireless communication method including receiving a PPDU including a preamble and a payload and decoding the payload based on the preamble. The preamble includes a plurality of training fields and a plurality of signaling fields. RU allocation information on the at least one receiving device is included in one of the plurality of signaling fields. The RU allocation information includes a first subfield indicating an arrangement of RUs in a frequency domain corresponding to the PPDU and a second subfield indicating a portion of the RUs to be combined to form a multiple RU.

According to aspects of the inventive concept, there are provided non-transitory computer-readable media, each having stored therein instructions, when executed by a main processor in a transmission device or a receiving device of a WLAN system, to cause the transmission device or receiving device to perform respective wireless communication methods as outlined above.

BRIEF DESCRIPTION OF THE DRAWINGS

Embodiments of the inventive concept will be more clearly understood from the following detailed description taken in conjunction with the accompanying drawings in which like reference characters refer to like elements throughout, wherein:

FIG. 8 is a view illustrating that the HE MU PPDU is arranged by frequency band;

FIG. 11 is a view illustrating another example of the user specific field of FIG. 7;

FIG. 20 is a table illustrating conventional RU arrangement indexing;

FIGS. 21, 22 and 23 are tables illustrating the RU arrangement indexing according to an embodiment of the inventive concept;

FIGS. 24A, 24B, 25A, 25B, 26A, 26B, 26C and 26D are views illustrating examples in which RU allocation information is formed according to an embodiment of the inventive concept;

DETAILED DESCRIPTION OF EMBODIMENTS

Figure 1:
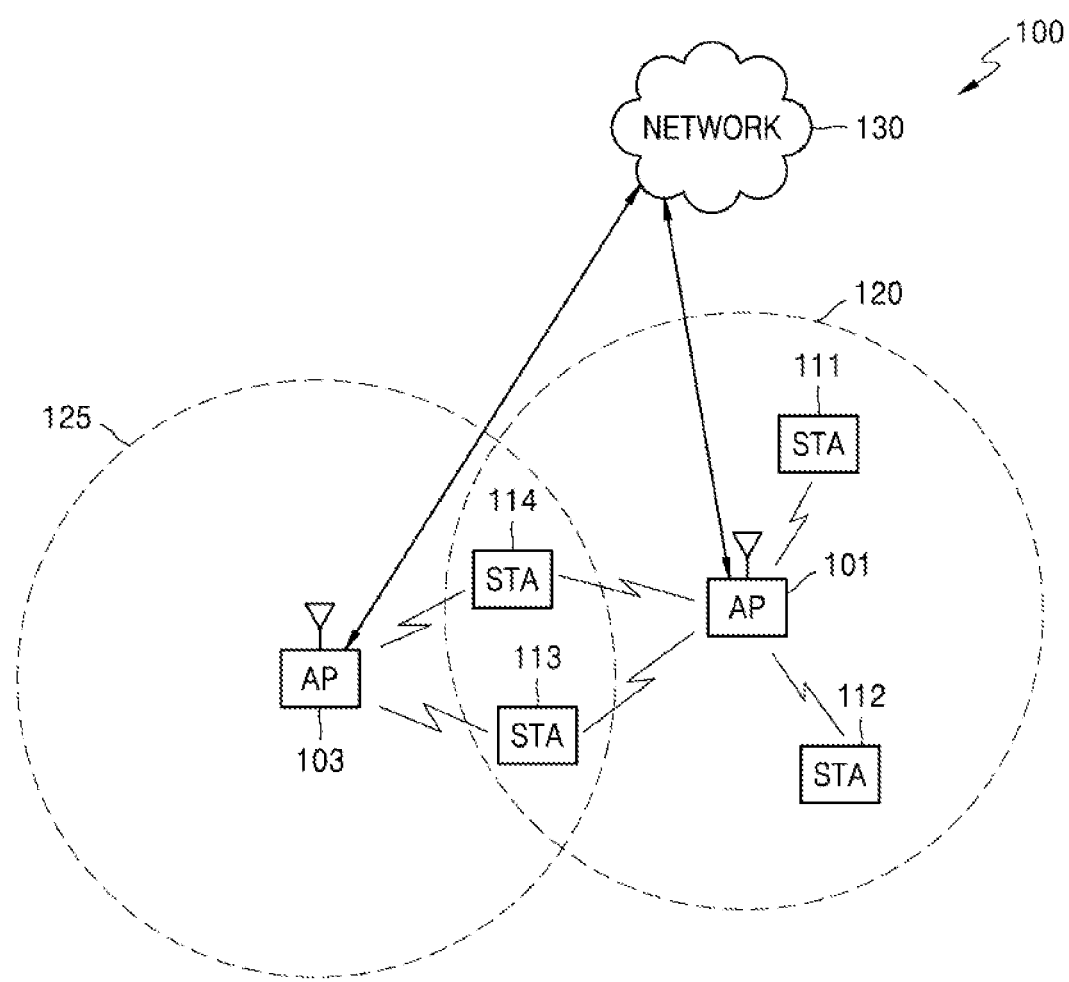
FIG. 1 is a view illustrating a wireless local area network (WLAN) system.

Hereinafter, embodiments of the inventive concept will be described in detail with reference to the accompanying drawings.

Terms used in the current specification are for describing embodiments and are not for limiting the inventive concept. In the current specification, a singular form includes a plural form unless specially described. Described components, processes, operations and/or elements do not exclude the presence or addition of one or more other components, processes, operations and/or elements.

Unless otherwise defined, all the terms (including technological and scientific terms) used in the current specification may be used in the meaning that may be commonly understood by those skilled in the art. In addition, terms defined in a commonly used dictionary are not ideologically or excessively interpreted unless specially defined.

In addition, in specifically describing the embodiments of the inventive concept, orthogonal frequency division multiplexing (OFDM) or an OFDM-based wireless communication system, in particular, the IEEE 802.11 standard is to be mainly described. However, the inventive concept may also be applied to other communication systems with a similar technological background and channel type (for example, a cellular communication system such as long term evolution (LTE), LTE-Advanced (LTE-A), new radio (NR)/5G, wireless broadband (WiBro), or global system for mobile communication (GSM) or a remote communication system such as Bluetooth or near field communication (NFC).

Herein, the term "connects (combines)" and derivatives thereof refer to direct or indirect communication between two or more components that physically contact or do not physically contact. The terms "transmits", "receives", and "communicates" and derivatives thereof include all direct and indirect communication. "Comprises" and/or "comprising" used in this document mean inclusion without limit. "Or" is a collective term meaning 'and/or'. "Is related to ~" and derivatives thereof mean includes, is included in ~, is connected to ~, implies, is implied in ~, is connected to ~, is combined with ~, may communicate with ~, cooperates with ~, interposes, puts in parallel, is close to ~, is bound to ~, has, has a feature of ~, and has a relation with ~. "A controller" means a certain device, system, or a part thereof controlling at least one operation. The controller may be implemented by hardware or a combination of hardware and software and/or firmware. A function related to a specific controller may be locally or remotely concentrated or dispersed.

In addition, various functions described hereinafter may be implemented or supported by one or more computer programs and each of the programs is formed of computer-readable program code and is executed in a computer-readable recording medium. "an application" and "a program" refer to one or more computer programs, software components, instruction sets, processes, functions, objects, classes, instances, related data, or parts thereof suitable for implementation of pieces of computer-readable program code. "computer-readable program code" include all types of computer code including source code, object code, and execution code. "computer-readable media" include all types media that may be accessed by a computer such as read only memory (ROM), random access memory (RAM), a hard disk drive, a compact disk (CD), a digital video disk (DVD), and other types of memory. "non-transitory" computer-readable media exclude wired, wireless, optical, or other communication links transmitting temporary electrical or other signals. Non-temporary computer-readable media include a medium in which data may be permanently stored and a medium in which data may be stored and may be overwritten later such as a rewritable optical disk or a deletable memory device.

Figure 2:
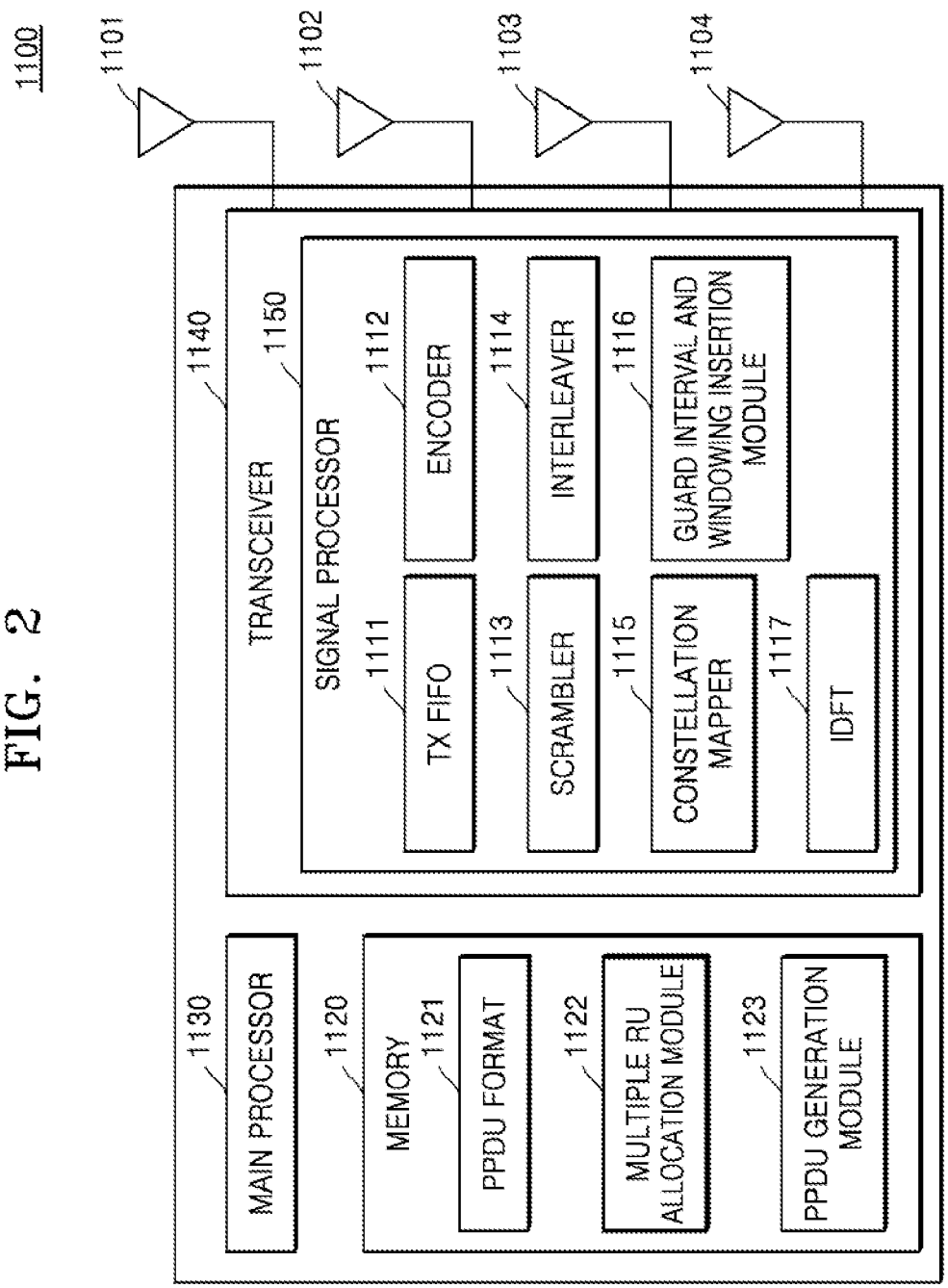
FIG. 2 is a block diagram illustrating a wireless communication device transmitting or receiving a physical layer convergence protocol (PLCP) protocol data unit (PPDU)

FIG. 1 is a view illustrating a wireless local area network (WLAN) system 100. FIG. 2 is a block diagram illustrating a wireless communication device 1100 transmitting or receiving a physical layer convergence protocol (PLCP) protocol data unit (PPDU).

As illustrated in FIG. 1, the WLAN system 100 may include access points (AP) 101 and 103. The APs 101 and 103 may communicate with at least one network 130 such as the Internet, an internet protocol (IP) network, or another data network. The APs 101 and 103 may provide wireless connection to the network 130 for a plurality of stations (STAs) 111 to 114 in coverage areas 120 and 125 thereof. The APs 101 and 103 may communicate with each other and with the STAs 111 to 114 by using wireless fidelity (WiFi) or other WLAN communication technologies. It is noted, in accordance with a network type, other well-known terms such as "router" and "gateway" may be used instead of "AP". In WLAN, the AP provides (sets) a wireless channel. A STA can operate as an AP in an ad hoc (peer to peer) WLAN network configuration. Accordingly, in the following description, functions ascribed to an AP may alternatively be performed by a STA in a peer to peer network configuration.

In addition, in accordance with the network type, the term "STA" may be used instead of other well-known terms such as "mobile station", "subscriber station", "remote terminal", "user equipment (UE)", "wireless terminal", "user device", or "user". Hereafter "STA" is used as an example for representing a wireless device wirelessly connected to the AP or connected to the wireless channel in the WLAN. Further, in the following description, the STA is considered as a mobile device (for example, a mobile telephone or a smartphone). However, the STA may be a fixed device (for example, a desktop computer, an AP, a media player, a fixed sensor, or a television set).

Approximate extents of the coverage areas 120 and 125 are marked with dashed lines. Here, the coverage areas 120 and 125 are illustrated as being circular for convenience sake. However, each of the coverage areas 120 and 125 related to the APs 101 and 103 may have another shape to which a varying change in wireless environment related to a natural or artificial obstruction is reflected or another irregular shape in accordance with setting of the APs 101 and 103.

As described in detail later, the APs 101 and 103 may include a circuitry and/or a program for managing transmission of an uplink multiuser (ULMU) or a downlink multiuser (DLMU) in the WLAN system 100.

Although FIG. 1 illustrates an example of the WLAN system 100, various changes may be made to FIG. 1 in other embodiments. For example, the WLAN system 100 may include an arbitrary number of properly arranged APs and an arbitrary number of STAs. In addition, the AP 101 may directly communicate with an arbitrary number of STAs.

The AP 101 may provide wireless broadband access to the plurality of STAs 111 to 114 via the network 130.

Similarly, each of the APs 101 and 103 may directly communicate with the network 130 and may provide wireless broadband access to the plurality of STAs 111 to 114 via the network 130. In addition, the APs 101 and 103 may be configured to connect to a desired external network such as an external telephone network or a data network.

As shown in FIG. 2, a wireless communication device transmitting or receiving the PPDU is illustrated. For example, the wireless communication device 1100 ("device 1100") of FIG. 2 may have both transmit and receive functionality but may be primarily a transmission device (e.g., an AP) or primarily a receiving device (e.g., a STA) with a transceiver capable of performing data communication. For instance, the wireless communication device 1100 of FIG. 2 may be any of the APs 101 and 103 or the STAs 111 to 114 illustrated in FIG. 1 and/or may be applied to a sensor, a computer, a smartphone, a portable electronic device, a tablet, a wearable device, or an Internet of Things (IoT).

Hereinafter, a case in which the wireless communication device 1100 is the transmission device is taken as an example. Analogous aspects may apply to a receiving device.

The wireless communication device 1100 may include a main processor 1130, memory 1120, a transceiver 1140, and antenna arrays 1101 to 1104. The main processor 1130, the memory 1120, the transceiver 1140, and the antenna arrays 1101 to 1104 may be directly and indirectly connected to each other.

The main processor 1130 may control the memory 1120 and the transceiver 1140. A PPDU format and multiple resource unit (RU) allocation information may be stored in the memory 1120. In addition, the transceiver 1140 may generate the PPDU by using the PPDU format and the multiple RU allocation information stored in the memory 1120. Furthermore, the transceiver 1140 may transmit the generated PPDU to an external receiving device (e.g., a STA) through the antenna arrays 1101 to 1104.

Here, the memory 1120 may store a PPDU format 1121 including a multiple RU allocation signaling format according to an embodiment of the inventive concept, which will be described later. In addition, the memory 1120 may store processor-executable instructions executing a multiple RU allocation module 1122 and a PPDU generation module 1123. The processor-executable instructions may be executed by the main processor 1130.

For example, the multiple RU allocation module 1122 may use an RU allocation algorithm, method, or policy in order to allocate a multiple RU to a user (for example, the STA) according to an embodiment of the inventive concept. The PPDU generation module 1123 may generate signaling and indication related to multiple RU allocation in a control field (hereinafter, referred to as a signaling field; for example, HE-SIG-A, HE-SIG-B, or EHT-SIG) of the PPDU.

The transceiver 1140 may include a signal processor 1150. The signal processor 1150 may include various modules (that is, various transmission path modules) generating sections of the PPDU or various types of communication transmission units.

Specifically, the signal processor 1150 may include a transmit first-in-first-out (TX FIFO) 1111, an encoder 1112, a scrambler 1113, an interleaver 1114, a constellation mapper 1115 capable of, for example, generating a QAM symbol, a guard interval and windowing insertion module 1116 capable of, for example, providing a guard interval on a frequency in order to reduce interference on a spectrum and transforming a signal through windowing, and an inversed discrete Fourier transformer (IDFT) 1117.

The transceiver 1140 may include circuitry known to those skilled in the art to implement its functionality as discussed herein. The corresponding functions may be executed by methods known to those skilled in the art by using hardware, firmware, software logic, or a combination of hardware, firmware, and software logic.

During receiving operations, the transceiver 1140 may receive the PPDU including a preamble and a payload from the transmission device. The transceiver 1140 may decode the payload based on the preamble of the received PPDU. To this end, the transceiver 1140 may identify an RU allocated for device 1100 by decoding the preamble of the PPDU through an internal decoder (not shown) and may decode the payload (the payload received from the transmission device) transmitted to the device 1100 based on the identified RU.

It is noted here that the decoding of the payload may alternatively be performed by another component of device 1100 (for example, the main processor 1130). According to an embodiment of the inventive concept described hereafter, the payload is decoded based on the preamble of the PPDU received by the transceiver 1140.

Hereinafter, high efficiency (HE) PPDUs used in the IEEE 802 standard (e.g., version 802.11ax) will be described with reference to FIGS. 3 to 15. The HE PPDUs described with reference to FIGS. 3 to 15 may be generated by the wireless communication device 1100 of FIG. 2.

Figure 3:
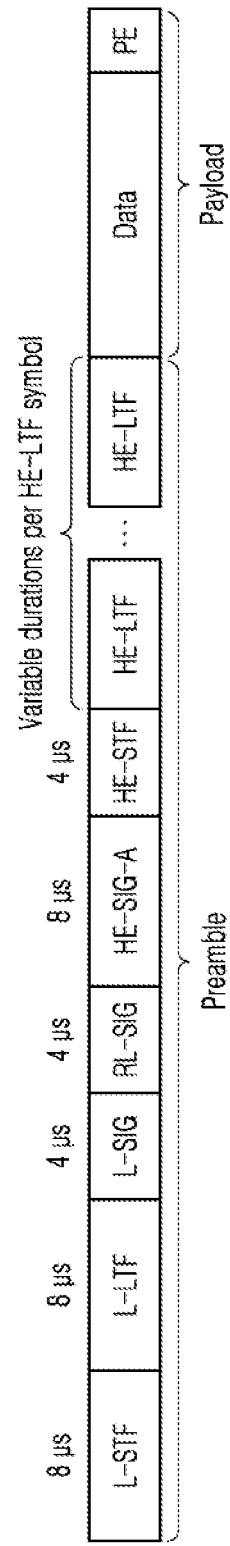
FIG. 3 is a view illustrating a structure of a high efficiency (HE) single user (SU) PPDU.
Figure 4:
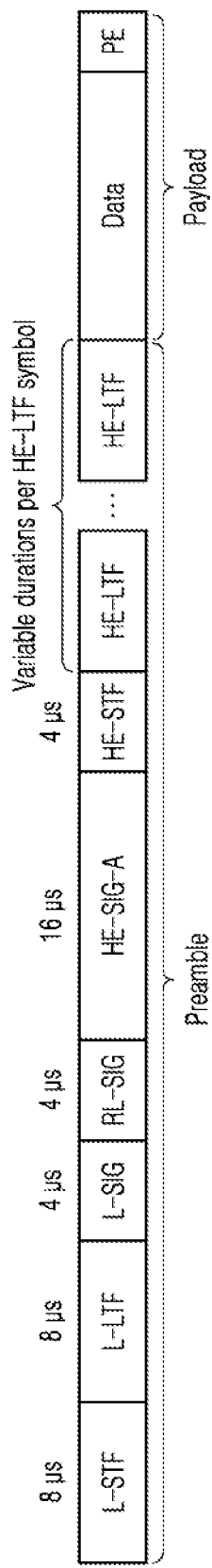
FIG. 4 is a view illustrating a structure of an HE extended range (ER) SU PPDU.
Figure 5:
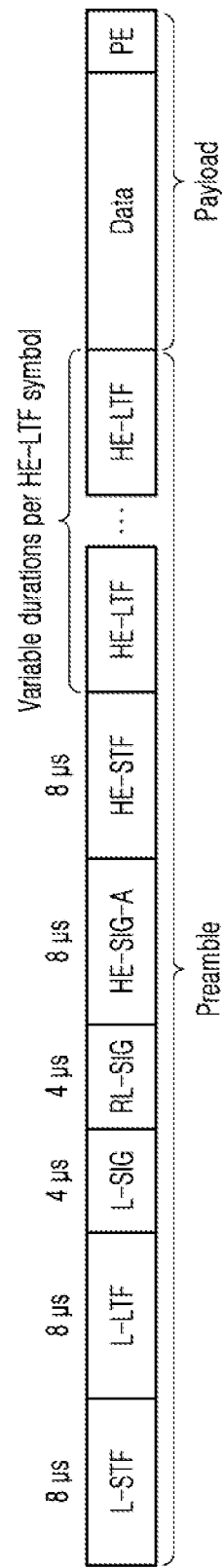
FIG. 5 is a view illustrating a structure of an HE trigger based (TB) PPDU.
Figure 6:
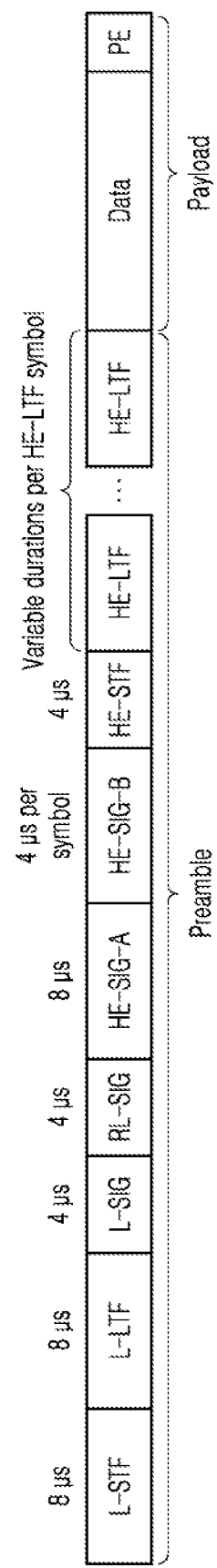
FIG. 6 is a view illustrating a structure of an HE multiuser (MU) PPDU.
Figure 7:
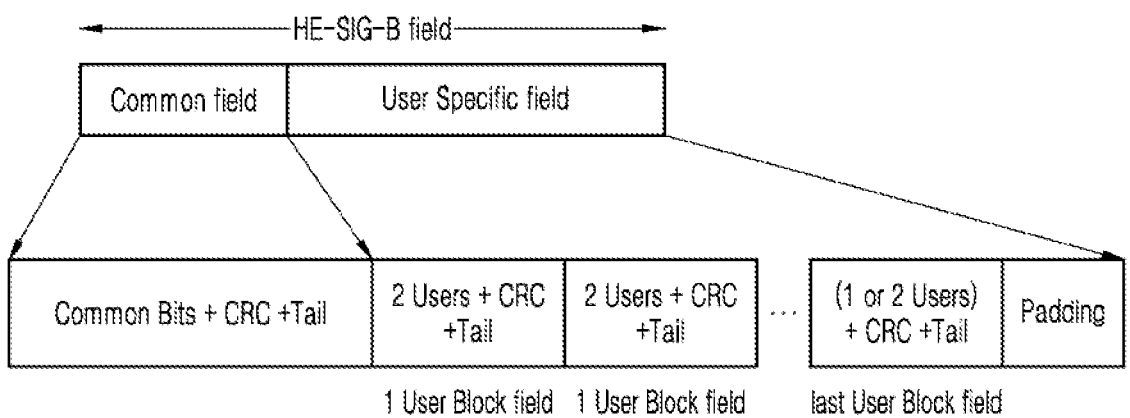
FIG. 7 is a view illustrating a structure of the HE-SIG-B field of FIG. 6.
Figure 9:
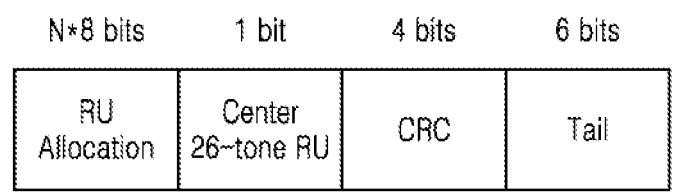
FIG. 9 is a view illustrating a structure of the common field of FIG. 7.
Figure 10:
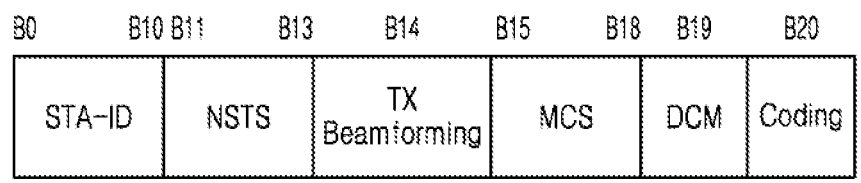
FIG. 10 is a view illustrating an example of the user specific field of FIG. 7.
Figure 12:
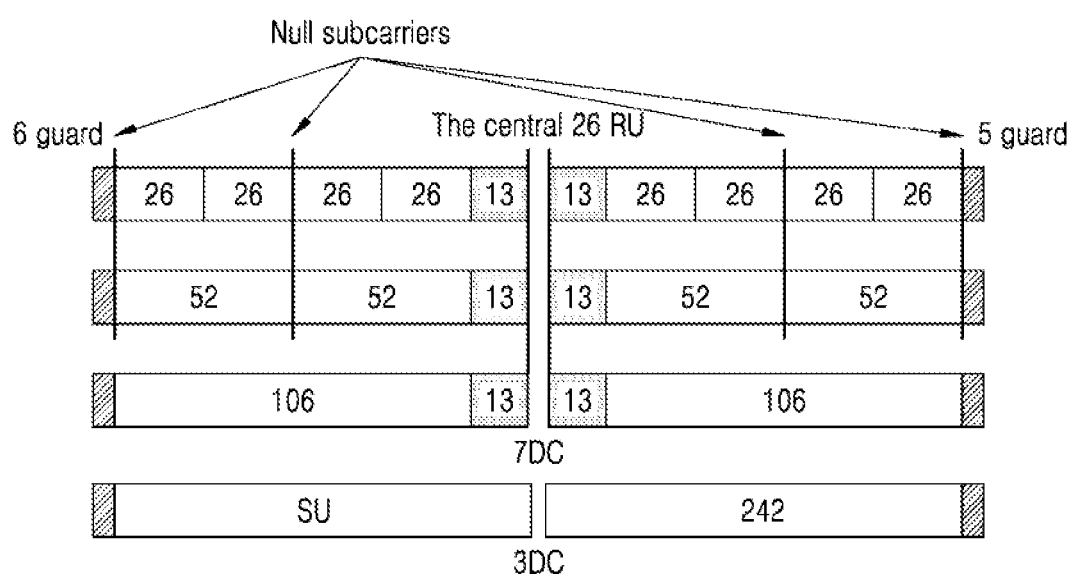
FIG. 12 is a view illustrating an example of a size and a position of a resource unit (RU) available in a 20 MHz OFDMA PPDU.
Figure 13:
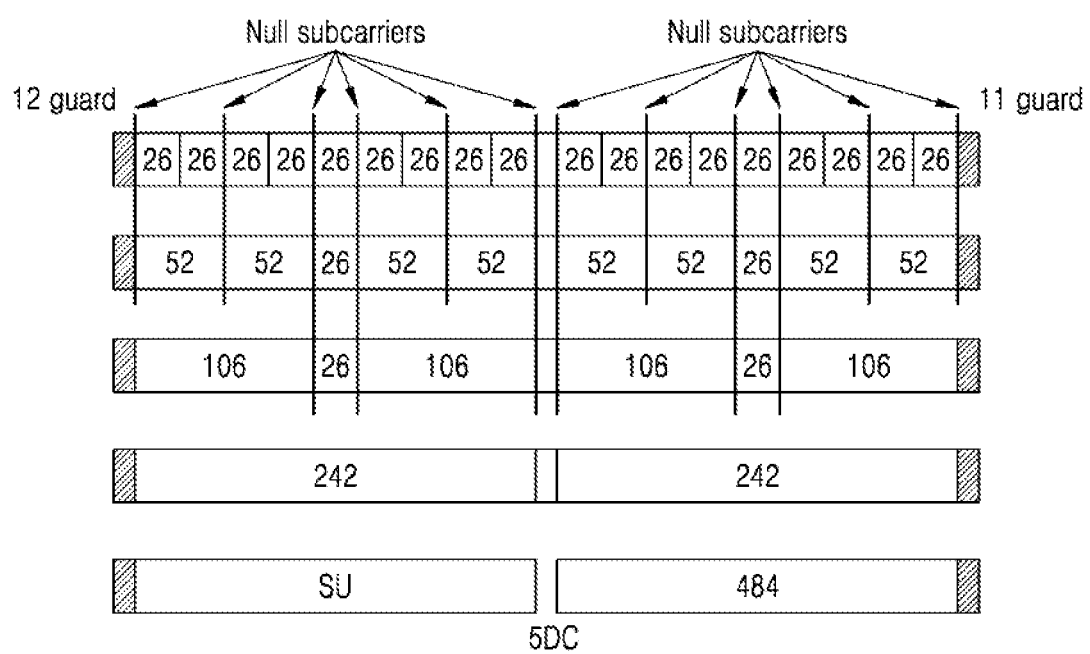
FIG. 13 is a view illustrating an example of a size and a position of an RU available in a 40 MHz OFDMA PPDU.
Figure 14:
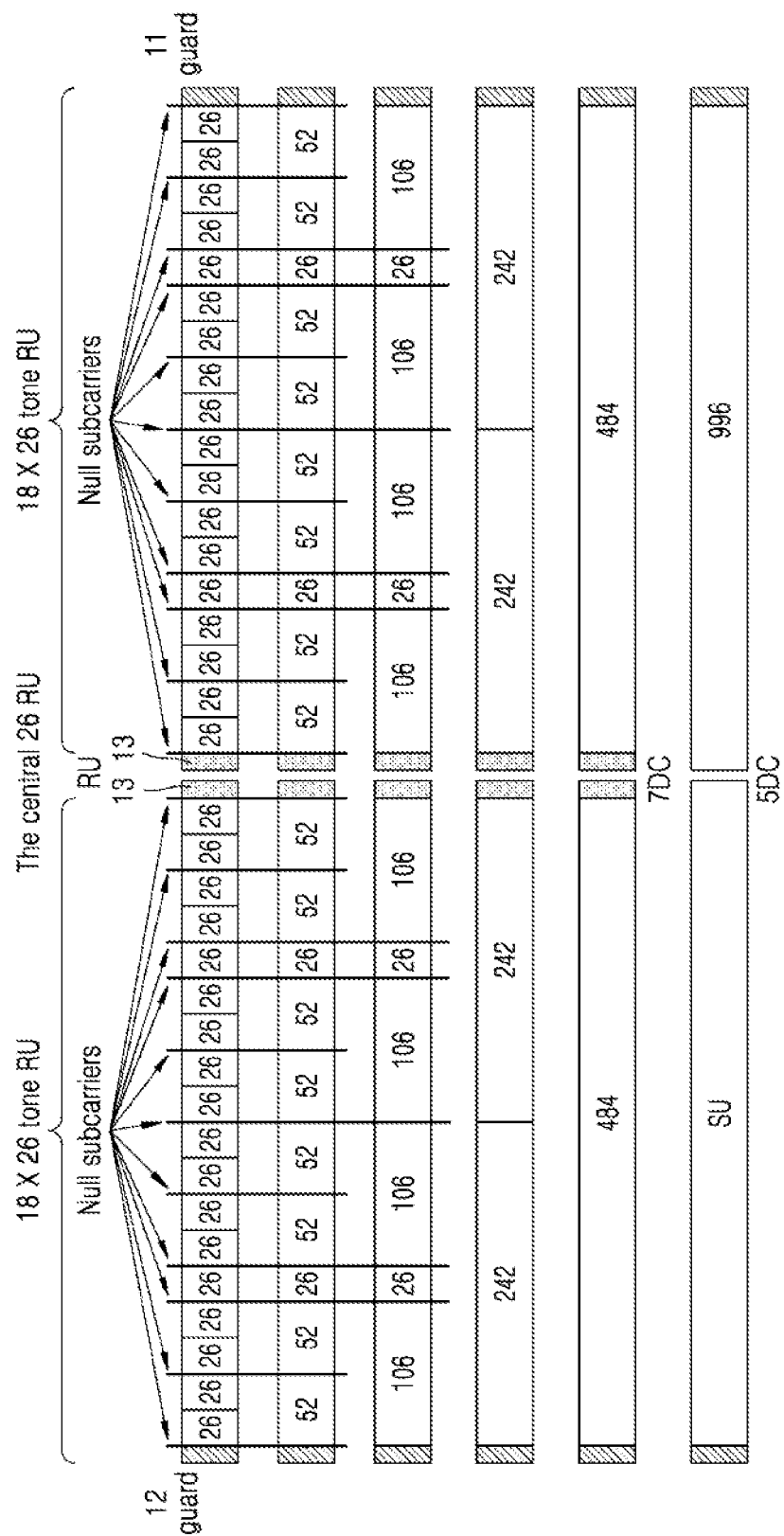
FIG. 14 is a view illustrating an example of a size and a position of an RU available in an 80 MHz OFDMA PPDU.
Figure 15:
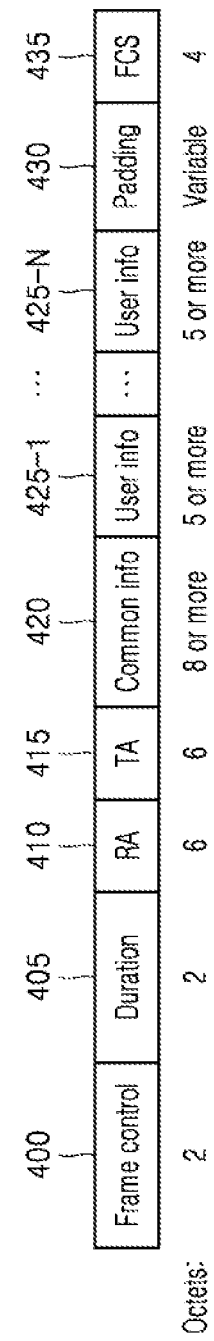
FIG. 15 is a view illustrating a structure of a trigger frame.

FIG. 3 is a view illustrating a structure of an HE single user (SU) PPDU. FIG. 4 is a view illustrating a structure of an HE extended range (ER) SU PPDU. FIG. 5 is a view illustrating a structure of an HE trigger based (TB) PPDU. FIG. 6 is a view illustrating a structure of an HE multiuser (MU) PPDU. FIG. 7 is a view illustrating a structure of the HE-SIG-B field of FIG. 6. FIG. 8 is a view illustrating that the HE MU PPDU is arranged by frequency band. FIG. 9 is a view illustrating a structure of the common field of FIG. 7. FIG. 10 is a view illustrating an example of the user specific field of FIG. 7. FIG. 11 is a view illustrating another example of the user specific field of FIG. 7. FIG. 12 is a view illustrating an example of a size and a position of an RU available in a 20 MHz orthogonal frequency division multiple access (OFDMA) PPDU. FIG. 13 is a view illustrating an example of a size and a position of an RU available in a 40 MHz OFDMA PPDU. FIG. 14 is a view illustrating an example of a size and a position of an RU available in an 80 MHz OFDMA PPDU. FIG. 15 is a view illustrating a structure of a trigger frame.

As illustrated in FIGS. 3 to 6, each HE PPDU may include a preamble including a plurality of training fields and a plurality of signaling fields and a payload including a data (DATA) field and a packet extension (PE) field.

Specifically, each HE PPDU may include a legacy-short training field (L-STF) with a length of 8 us, a legacy-long training field (L-LTF) with a length of 8 us, a legacy-signal (L-SIG) field with a length of 4 us, a repeated L-SIG (RL-SIG) field with a length of 4 us, a high efficiency-signal-A (HE-SIG-A) field with a length of 8 us, an HE-STF with a length of 4 us, an HE-LTF, a DATA field, and a PE field.

The HE SU PPDU of FIG. 3 does not include an HE-SIG-B field, and the HE MU PPDU of FIG. 6 may further include the HE-SIG-B field. The HE ER SU PPDU of FIG. 4 does not include the HE-SIG-B field. However, a symbol of the HE-SIG-A field may be repeated with a length of 16 us. In addition, the HE TB PPDU of FIG. 5 does not include the HE-SIG-B field. However, a symbol of the HE-STF may be repeated with a length of 8 us.

Here, the fields included in the preamble will be simply described as follows.

The L-STF may include a short training orthogonal frequency division multiplexing (OFDM) symbol and may be used for frame detection, automatic gain control (AGC), diversity detection, and coarse frequency/time synchronization.

The L-LTF may include a long training OFDM symbol and may be used for fine frequency/time synchronization and channel estimation.

The L-SIG field may be used for transmitting control information and may include information on a data rate and a data length. For example, the L-SIG field may be repeatedly transmitted. A format in which the L-SIG field is repeated is referred to as the RL-SIG field.

The HE-SIG-A field may include control information common to the receiving device, which is as follows.

1) a downlink (DL)/uplink (UL) indicator
2) a basic service set (BSS) color field that is an identifier of a BSS
3) a field indicating a remaining time of a current transmission opportunity (TXOP) period
4) a bandwidth field indicating 20/40/80/160/80+80 MHz
5) a field indicating a modulation and coding scheme (MCS) applied to the HE-SIG-B field
6) a field indicating whether the HE-SIG-B field is modulated by a dual subcarrier modulation scheme
7) a field indicating the number of symbols used for the HE-SIG-B field
8) a field indicating whether the HE-SIG-B field is generated over the entire band
9) a field v the number of symbols of the HE-LTF
10) a field indicating a length of the HE-LTF and a length of a cyclic prefix (CP) field
11) a field indicating whether an additional OFDM symbol is provided for low density parity check (LDPC) coding
12) a field indicating control information on the PE field
13) a field indicating information on a cyclical redundancy check (CRC) field of the HE-SIG-A field The HE-SIG-A field may further include various information items other than the above-described 1) to 13) or may omit some of the information items among the above-described 1) to 13). In environments other than an MU environment, other information items may be further added to the HE-SIG-A field or some of the information items of the HE-SIG-A field may be omitted.

The HE-SIG-B field may be used for the PPDU for the MU. The HE-SIG-B field may be omitted from the PPDU for the SU. The HE-SIG-A field or the HE-SIG-B field may include RU allocation information on at least one receiving device, The HE-SIG-B field will be described hereinafter in detail with reference to FIGS. 7 to 11.

As illustrated in FIG. 7, the HE-SIG-B field may include a common field including common control information and a user-specific field including user-specific control information.

Here, the common field may be separately encoded from the user-specific field. In addition, the common field may include RU allocation related information and 'a CRC subfield' corresponding to the RU allocation related information and may be coded by one binary convolutional coding (BCC) block. The user-specific field may include information for decoding payloads of two users (for example, two STAs) and 'a CRC subfield' corresponding to the information and may be coded by one BCC block.

For example, the HE-SIG-B field may be obtained by duplicating an HE-SIG-B field of another frequency band.

For example, referring to FIG. 8, an HE-SIG-B field transmitted by a partial frequency band (for example, a fourth frequency band 784) may include control information for a data field of another frequency band (for example, a second frequency band 782) as well as a data field of the corresponding frequency band (that is, the fourth frequency band 784). Therefore, the HE-SIG-B field of a specific frequency band (for example, the second frequency band 782) may be a format (that is, a form) obtained by duplicating the HE-SIG-B field of another frequency band (for example, the fourth frequency band 784). Therefore, the HE-SIG-B field may be transmitted to an entire RU in encoded form.

On the other hand, as illustrated in FIG. 9, the common field of the HE-SIG-B field may include various subfields such as an RU allocation subfield, a center 26-tone RU subfield, a CRC subfield, and a tail subfield.

Specifically, the RU allocation subfield may have N×8 (N is one of 1, 2, and 4) bits. The RU allocation subfield may indicate RU allocation in a frequency domain and the number of user fields (for example, the number of STAs) in each RU. In addition, an RU with a size of no less than 106-subcarriers (106-tones) supporting MU-MIMO may indicate the number of multiplexed users by using the MU-MIMO.

The variable N may be 1 for 20 MHz and 40 MHz HE MU PPDUs, N may be 2 for a 80 MHz HE MU PPDU, and N may be 4 for a 160 MHz or 80+80 MHz HE MU PPDU.

On the other hand, the center 26-tone RU subfield may have 1 bit and may be provided to indicate whether an entire bandwidth is 80 MHz, 160 MHz, or 80+80 MHz. The CRC subfield may have 4 bits and may be used for detecting an error for common field data. In addition, the tail subfield may have 6 bits, may be used for terminating trellis of a convolution decoder, and may be set as 0.

As illustrated in FIGS. 10 and 11, the user-specific field of the HE-SIG-B field may include various subfields such as an STA-ID subfield, an MCS subfield, a coding subfield.

Configurations of subfields of the user-specific field of the HE-SIG-B field may change in accordance with whether the user-specific field is an MU-MIMO allocation field.

For instance, in FIG. 10, when the user-specific field of the HE-SIG-B field is not the MU-MIMO allocation field (that is, non-MU-MIMO), the user-specific field of the HE-SIG-B field may include an STA-ID subfield (bits B0 to B10=11 bits), an NSTS subfield (bits B11 to B13=3 bits), a TX beamforming subfield (bit B14=1 bit), an MCS subfield (bits B15 to B18=4 bits), a dual carrier modulation (DCM) subfield (bit B19=1 bit), and a coding subfield (bit B20=1 bit).

A value of the STA-ID subfield may be set as a value of a TXVECTOR parameter STA_ID. The NSTS subfield may be divided into a case in which the STA-ID subfield is 2046 and a case in which the STA-ID subfield is not 2046 and may indicate the number of space-time streams. Therefore, when the STA-ID subfield is not 2046, the NSTS subfield may be set as one less than the number of space-time streams. On the other hand, when the STA-ID subfield is 2046, the NSTS subfield may be set as an arbitrary value.

The TX beamforming subfield may be divided into a case in which the STA-ID subfield is 2046 and a case in which the STA-ID subfield is not 2046 and may be used for transmit beamforming. Therefore, when the STA-ID subfield is not 2046, the TX beamforming subfield may be set as 1 (that is, a case in which a beamforming steering matrix is applied to a waveform of SU transmission) or 0 (other cases). On the other hand, when the STA-ID subfield is 2046, the TX beamforming subfield may be set as an arbitrary value.

The MCS subfield may be divided into a case in which the STA-ID subfield is 2046 and a case in which the STA-ID subfield is not 2046 and may indicate a modulation and coding scheme. Therefore, when the STA-ID subfield is not 2046, the MCS subfield may be set as n (n=0, 1, 2, . . . , 11/12 to 15 are reserved). On the other hand, when the STA-ID subfield is 2046, the MCS subfield may be set as an arbitrary value.

The DCM subfield may be divided into a case in which the STA-ID subfield is 2046 and a case in which the STA-ID subfield is not 2046 and may indicate whether a DCM is used. Therefore, when the STA-ID subfield is not 2046, the DCM subfield may be set as 1 (representing that a corresponding payload of a user of the HE MU PPDU is modulated into the DCM) or 0 (representing that the corresponding payload of the user of the HE MU PPDU is not modulated into the DCM). On the other hand, when the STA-ID subfield is 2046, the DCM subfield may be set as an arbitrary value.

The coding subfield may be divided into a case in which the STA-ID subfield is 2046 and a case in which the STA-ID subfield is not 2046 and may indicate whether BCC or LDPC is used. Therefore, when the STA-ID subfield is 2046, the coding subfield may be set as 0 (representing that the BCC is used) or 1 (representing that the LDPC is used). On the other hand, when the STA-ID subfield is not 2046, the coding subfield may be set as an arbitrary value.

On the other hand, in FIG. 11, when the user-specific field of the HE-SIG-B field is the MU-MIMO allocation field (that is, MU-MIMO), the user-specific field of the HE-SIG-B field may include an STA-ID subfield (consisting of B0 to B10-11 bits), a spatial configuration subfield (consisting of B11 to B14-4 bits), an MCS subfield (consisting of B15 to B18-4 bits), a reserved subfield (consisting of B19-1 bit), and a coding subfield (consisting of B20-1 bits).

A value of the STA-ID subfield may be set as a value indicated by a TXVECTOR parameter STA_ID. The spatial configuration subfield may be used for indicating the number of spatial streams for a user (for example, the STA) while allocating the MU-MIMO.

The MCS subfield may indicate a modulation and coding scheme. Therefore, the MCS subfield may be set as n (n=0, 1, 2, . . . , 11/12 to 15 are reserved).

The reserved subfield may be reserved and set as 0. The coding subfield may display whether the BCC or the LDPC is used. Therefore, the coding subfield may be set as 0 (representing that the BCC is used) or 1 (representing that the LDPC is used).

In FIG. 11, the coding subfield may be divided into a case in which the STA-ID subfield is 2046 and a case in which the STA-ID subfield is not 2046. The descriptions above are of the case in which the STA-ID subfield is not 2046. That is, when the STA-ID subfield is 2046, the spatial configuration subfield, the MCS subfield, the reserved subfield, and the coding subfield may be set as arbitrary values.

Because the HE-SIG-B field may be formed as described above, redundant description thereof is omitted.

Referring to FIGS. 3 to 6 again, the HE-STF may be used for improving automatic gain control estimation in a multiple input multiple output (MIMO) environment or an OFDMA environment.

The HE-LTF may be used for estimating a channel in the MIMO environment or the OFDMA environment.

A magnitude of fast Fourier transform (FFT)/inverse fast Fourier transform (IFFT) applied to the HE-STF and the fields after the HE-STF may be different from a magnitude of FFT/IFFT applied to the fields before the HE-STF. For example, the magnitude of the FFT/IFFT applied to the HE-STF and the fields after the HE-STF may be greater than the magnitude of the FFT/IFFT applied to the fields before the HE-STF.

Therefore, a frequency band used by the fields before the HE-STF may not correctly coincide with a frequency band used by the HE-STF and the fields after the HE-STF. As an example, in FIGS. 3 to 6, it illustrates the frequency band used by the fields before the HE-STF correctly coincides with the frequency band used by the HE-STF and the fields after the HE-STF.

The following discussion will briefly describe the fields included in the payload.

The data field may include data for at least one user. That is, the data field may carry a physical layer service data unit (PSDU) for at least one user.

In addition, at least one RU including different numbers of tones (that is, subcarriers) may be arranged in a frequency domain of the data field based on the RU allocation information included in the signaling field of the preamble.

That is, as illustrated in FIGS. 12 to 14, at least one RU may be arranged in the frequency domain (the horizontal axis of each of FIGS. 12 to 14 represents the frequency domain) of the data field.

First, in FIG. 12, the arrangement of the RU available in the 20 MHz OFDMA PPDU is illustrated.

Specifically, in the leftmost band of a 20 MHz band, six tones (that is, subcarriers) may be used as a guard band and, in the rightmost band of the 20 MHz band, five tones may be used as a guard band. Seven direct current (DC) tones may be inserted into a central band, that is, a DC band and a 26-subcarrier RU corresponding to 13 tones may be provided on each of left and right sides of the DC band. In addition, 26-subcarrier RUs, 52-subcarrier RUs, and 106-subcarrier RUs may be allocated for other bands. Each RU may be allocated for a receiving device, that is, a user.

For example, the RU arrangement of FIG. 12 may be used for a situation for an SU as well as a situation for a MU. Therefore, as illustrated in the uppermost portion of FIG. 12, a plurality of 26-subcarrier RUs may be arranged and, as illustrated in the lowermost portion of FIG. 12, one 242-subcarrier RU may be arranged (in this case, three DC tones may be inserted into the central band).

Various sizes of RUs, that is, the 26-subcarrier RUs, the 52-subcarrier RUs, the 106-subcarrier RUs, and the 242-subcarrier RU are illustrated in an example of FIG. 12. Because the specific sizes of the RUs may increase, an embodiment of the inventive concept is not limited to the specific sizes (that is, the numbers of corresponding tones) of the RUs.

As another example, in FIG. 13, the arrangement of the RU available in the 40 MHz OFDMA PPDU is illustrated.

Specifically, in the leftmost band of a 40 MHz band, 12 tones (that is, subcarriers) may be used as a guard band and, in the rightmost band of the 40 MHz band, 11 tones may be used as a guard band. In addition, five DC tones may be inserted into a central band, that is, a DC band. In addition, 26-subcarrier RUs, 52-subcarrier RUs, 106-subcarrier RUs, and 242-subcarrier RUs may be allocated for other bands. Each RU may be allocated for a receiving device, that is, a user.

The RU arrangement of FIG. 13 may be used for a situation for a SU as well as a situation for a MU. Therefore, as illustrated in the lowermost portion of FIG. 13, one 484-subcarrier RU may be arranged (in this case, five DC tones may be inserted into the central band).

Various sizes of RUs, that is, the 26-subcarrier RUs, the 52-subcarrier RUs, the 106-subcarrier RUs, the 242-subcarrier RUs, and the 484-subcarrier RU are illustrated in an example of FIG. 13. Because the specific sizes of the RUs may increase, an embodiment of the inventive concept is not limited to the specific sizes (that is, the numbers of corresponding tones) of the RUs.

Finally, in FIG. 14, the arrangement of the RU available in the 80 MHz OFDMA PPDU is illustrated.

Specifically, in the leftmost band of an 80 MHz band, 12 tones (that is, subcarriers) may be used as a guard band and, in the rightmost band of the 80 MHz band, 11 tones may be used as a guard band. In addition, seven DC tones may be inserted into a central band, that is, a DC band. In addition, 26-subcarrier RUs, 52-subcarrier RUs, 106-subcarrier RUs, 242-subcarrier RUs, and 484-subcarrier RUs may be allocated for other bands. Each RU may be allocated for a receiving device, that is, a user.

The RU arrangement of FIG. 14 may be used for a situation for a SU as well as a situation for a MU. Therefore, as illustrated in the lowermost portion of FIG. 14, one 996-subcarrier RU may be arranged (in this case, five DC tones may be inserted into the central band).

Various sizes of RUs, that is, the 26-subcarrier RUs (hereinafter, "RU26", interchangeably), the 52-subcarrier RUs (hereinafter, "RU52"), the 106-subcarrier RUs (hereinafter, "RU106"), the 242-subcarrier RUs (hereinafter, "RU242"), the 484-subcarrier RUs (hereinafter, "RU484"), and the 996-subcarrier RU (hereinafter, "RU996") are shown in an example of FIG. 14. Because the specific sizes of the RUs may increase, an embodiment of the inventive concept is not limited to the specific sizes (that is, the numbers of corresponding tones) of the RUs.

For example, RU positions available in the 40 MHz OFDMA PPDU are the same as two replicas of RU positions available in the 20 MHz OFDMA PPDU. In addition, RU positions available in the 80 MHz OFDMA PPDU are the same as two replicas of the RU positions available in the 40 MHz OFDMA PPDU. One OFDMA PPDU may include a combination of different RU sizes in each RU242 boundary.

As described above, at least one RU may be variously arranged in a frequency domain of a data field.

Referring to FIGS. 3 to 6 again, the PE field may have duration of 4 us, 8 us, 12 us, or 16 us and may provide an additional receive processing time at an end of the HE PPDU.

Because the fields of the preamble and the payload of the HE PPDU are formed as described above, in an embodiment of the inventive concept, one of the above-described HE PPDUs may be applied.

For example, when a UL transmission work is performed by one or more STAs (for example, non-AP STAs) on a frequency domain, the AP may allocate different frequency resources for one or more STAs as UL transmission resources based on the OFDMA. Here, the frequency resource may mean the RU and may be indicated by a trigger frame transmitted by the AP to the STA before the UL transmission work.

Therefore, to transmit the HE TB PPDU of FIG. 5, the trigger frame is required. The trigger frame is illustrated in FIG. 15.

Specifically, the trigger frame may allocate the RU for UL multiple-user transmission and may be transmitted by the AP to the STA. In addition, the trigger frame may be formed of an MAC frame and may be included in the PPDU.

The trigger frame may be transmitted through the PPDU illustrated in FIGS. 3 to 6 or a PPDU specially designed for the corresponding trigger frame. For example, when the trigger frame is transmitted through the PPDU illustrated in FIGS. 3 to 6, the trigger frame may be included in the data field.

Specifically, as illustrated in FIG. 15, a trigger frame may include a frame control field 400 (2 octets), a duration field 405 (2 octets), an RA field 410 (6 octets), a TA field 415 (6 octets), a common information field 420 (no less than 8 octets), individual user information fields 425-1 to 425-N (N is a natural number of no less than 1 and each no less than 5 octets), a padding field 430, and a frame check sequence (FCS) field 435 (no less than 4 octets).

First, the frame control field 400 may include information on a version of a MAC protocol and other additional control information items and the duration field 405 may include time information for setting a network allocation vector (NAV) or information on an identifier (for example, an association ID (AID)) of a terminal. In addition, the RA field 410 may include address information of the receiving device (for example, the STA) of the corresponding trigger frame and may be omitted as required. The TA field 415 may include address information of the transmission devices (for example, the APs) of the corresponding trigger frame and the common information field 420 may include common control information applied to the receiving devices (for example, the STAs) receiving the corresponding trigger frame.

For example, in the common information field 420, a field indicating a length of an L-SIG field of an UL PPDU transmitted to the corresponding trigger frame or information controlling a content of an SIG-A field (that is, the HE-SIG-A field) of the UL PPDU transmitted to the corresponding trigger frame may be included. In addition, in the common information field 420, as common control information, information on a length of a CP of the UL PPDU transmitted to the corresponding trigger frame or information on a length of an LTF field may be included.

The trigger frame may include the individual user information fields 425-1 to 425-N (N is a natural number of no less than 1) corresponding to the number of receiving devices (for example, the STAs) receiving the trigger frame. For example, the individual user information fields may be referred to as "RU allocation fields". The trigger frame may include the padding field 430 and the FCS field 435.

Some fields of the trigger frame may be omitted and other fields may be added. In addition, a length of each field may be differently changed from being illustrated.

As described above, because the various HE PPDUs are used in the IEEE standard (version 802.11ax), an embodiment of the inventive concept may be implemented in the signaling fields (for example, the HE-SIG-A field and the HE-SIG-B field) of the above-described various HE PPDUs.

That is, an embodiment of the inventive concept relates to the method and the apparatus for supporting the MU by using the OFDMA, and more particularly, to the method and the apparatus for the transmission devices (for example, the APs) allocating the multiple RU for at least one of the plurality of receiving devices (for example, the STAs) through the OFDMA. Therefore, according to an embodiment of the inventive concept, a method and an apparatus for forming the signaling fields indicating information on the multiple RU allocated for the receiving devices (for example, the STAs) are provided. However, an embodiment of the inventive concept may be applied to a case in which an STA transmits data to an STA and a case in which an STA transmits data to an AP. In addition, an embodiment of the inventive concept may be applied to an environment in which a single user such as a SU PPDU is supported as well as a DL OFDMA method and an UL OFDMA.

Furthermore, an embodiment of the inventive concept may also be applied to version 802.11be, which is a next generation WLAN standard. A method and the apparatus for allocating the multiple RU according to an embodiment of the inventive concept may be implemented in signaling fields (for example, extremely high throughout (EHT)-SIG fields) of EHT PPDUs. Below, with reference to FIGS. 16 and 17, the EHT PPDUs used in the IEEE standard (version 802.11be) will be described. For example, the EHT PPDUs described with reference to FIGS. 16 and 17 may be generated by the wireless communication device 1100 of FIG. 2.

Figure 16:
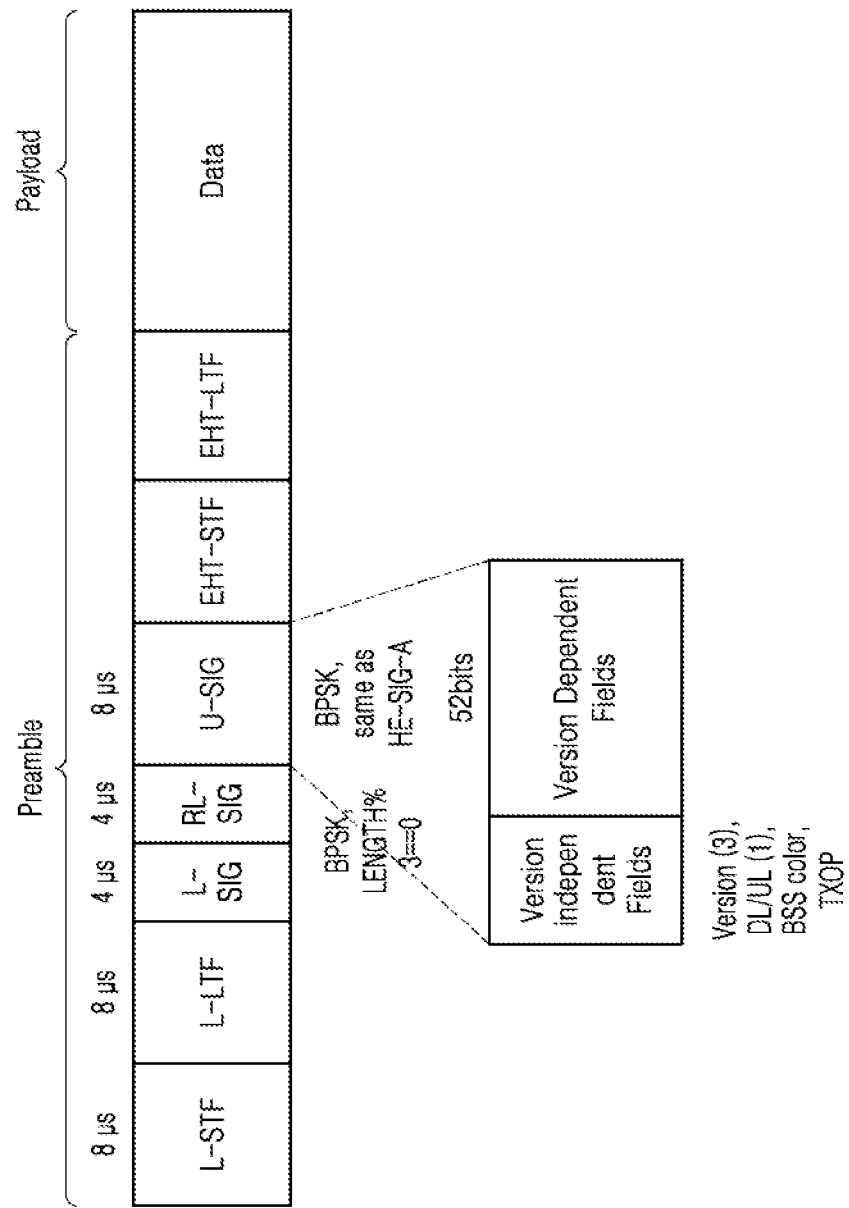
FIG. 16 is a view illustrating a structure of an extremely high throughput (EHT) TB PPDU.
Figure 17:
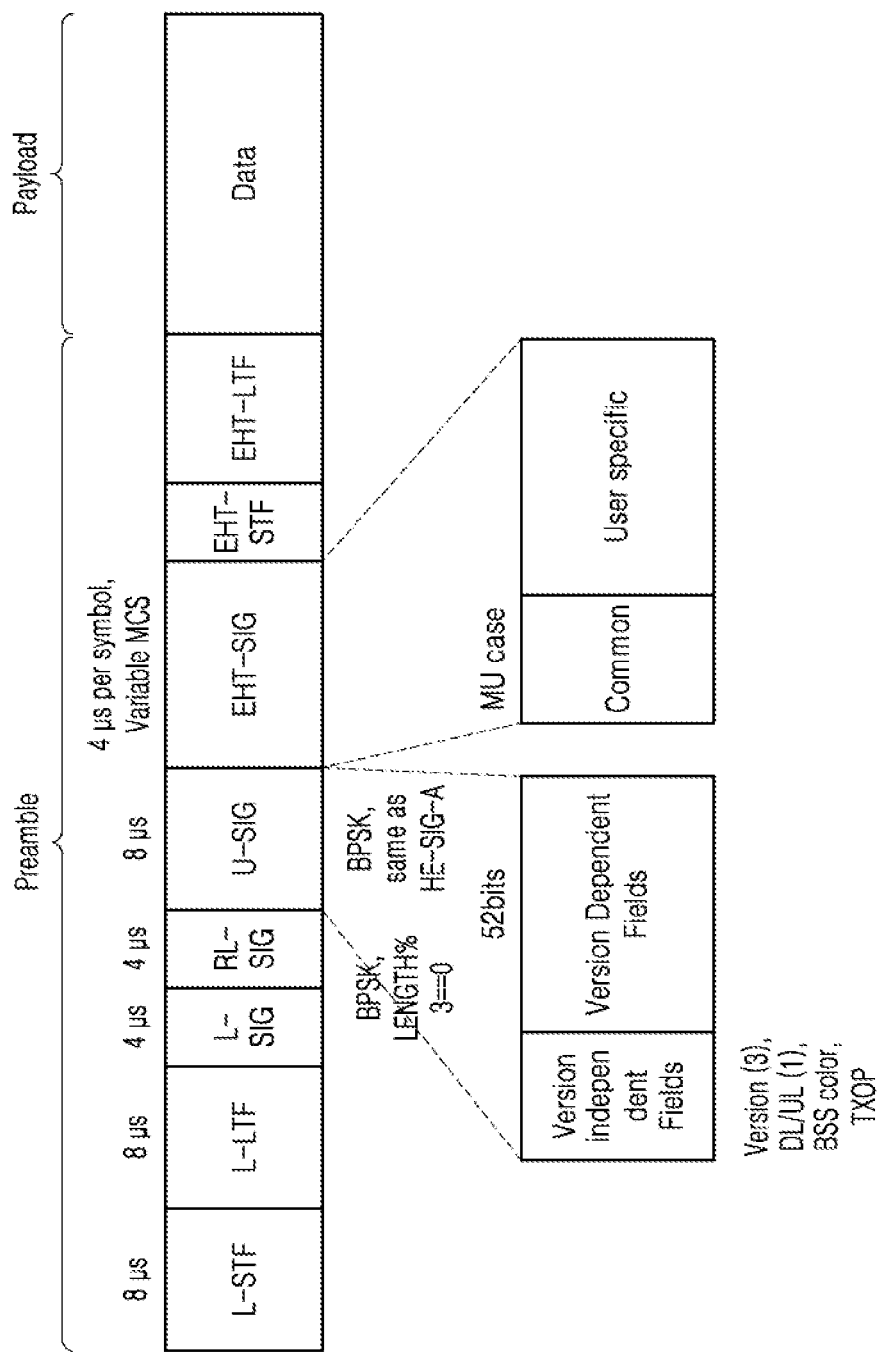
FIG. 17 is a view illustrating a structure of an EHT MU PPDU.

FIG. 16 is a view illustrating a structure of an EHT TB PPDU. FIG. 17 is a view illustrating a structure of an EHT MU PPDU.

As illustrated in FIGS. 16 and 17, each EHT PPDU may include a preamble including a plurality of training fields and a plurality of signaling fields and a payload including a data field.

Specifically, each EHT PPDU may include an L-STF with a length of 8 us, an L-LTF with a length of 8 us, an L-SIG field with a length of 4 us, a repeated L-SIG (RL-SIG) field with a length of 4 us, a universal-signal (U-SIG) field with a length of 8 us, an EHT-STF, an EHT-LTF, and a DATA field.

The EHT TB PPDU of FIG. 16 does not include an EHT-SIG field. However, a symbol of the EHT-STF may be repeated. The EHT MU PPDU of FIG. 17 may consist of a plurality of OFDM symbols and may further include the EHT-SIG field. In addition, like the above-described HE TB PPDU of FIG. 5, the EHT TB PPDU of FIG. 16 may require a trigger frame to transmit the EHT TB PPDU. The trigger frame for transmitting the EHT TB PPDU may have a structure and a function similar to those of the above-described trigger frame of FIG. 15.

For example, a PE field may be further included in each EHT PPDU. However, according to an embodiment of the inventive concept, for simplicity of understanding, it is illustrated that each EHT PPDU does not include the PE field.

Fields included in each EHT PPDU will be briefly described as follows.

The fields 'L-STF', 'L-LTF', 'L-SIG', and 'RL-SIG field' of each EHT PPDU are the same as or similar to those of the above-described HE PPDU; thus, detailed description will be omitted for brevity.

The U-SIG field, performing a function similar to that of the HE-SIG-A field of the HE PPDU, may be arranged immediately next to the RL-SIG field and may include commonly encoded two OFDM symbols.

For instance, the U-SIG field may include 'version-independent fields' and 'version-dependent fields' and 'the version-dependent fields' may be arranged next to 'the version-independent fields'.

Here, 'the version-independent fields' may have static location and bit definition over different generations/physical versions.

In addition, 'the version-independent fields' may include, for example, next control information.

1) a PHY version identifier (consisting of three bits)
2) an uplink (UL)/downlink (DL) flag (consisting of one bit)
3) a BSS color field that is an identifier of a BSS
4) a TXOP duration (that is, a field indicating a remaining time of a current TXOP period)
5) a bandwidth field (that may carry partial puncturing information)

On the other hand, 'the version-dependent fields' may have variable bit definition in each PHY version.

In addition, 'the version-dependent fields' may include, for example, next control information.
1) a PPDU type (a field indicating the PPDU type)
2) an EHT-SIG modulation and coding scheme (MCS) (a field indicating the MCS and provided in the U-SIG field of the EHT PPDU, which is transmitted to the MU)
3) the number of EHT-SIG symbols (a field indicating the number of symbols used for the EHT-SIG field and provided in the U-SIG field of the EHT PPDU, which is transmitted to the MU)

The U-SIG field may further include various information items other than the above-described control information or may not include partial information among the above-described control information items. In other environments except an MU environment, partial information may be further added to the U-SIG field or partial information of the U-SIG field may be omitted.

The EHT-SIG field performing a function similar to that of the HE-SIG-B field of the HE PPDU may be arranged immediately next to the U-SIG field in the EHT PPDU, which is transmitted to the MU, and may have a variable MCS and a variable length.

Specifically, the EHT-SIG field may include a common field including common control information and a user-specific field including user-specific control information.

Here, the common field may be encoded apart from the user-specific field. In addition, the common field may include RU allocation related information described later (that is, information including 'an RU allocation subfield' and 'an additional RU allocation subfield', which is described later) and the user-specific field may include information (that is, user information allocated for each RU) similar to information included in the user-specific field of the above-described HE-SIG-B field.

For example, in the common field of the EHT-SIG field of the EHT PPDU, which is transmitted to the MU, at least one compression mode in which 'the RU allocation subfield' is not provided may be provided. In addition, the EHT-SIG field may be basically used for the PPDU for the MU. However, unlike in 'the HE PPDU', when an overhead of the U-SIG field increases, the EHT-SIG field may be used for the PPDU for transmitting the SU.

Because the EHT-SIG field may be formed as described above, detailed description thereof will not be given.

As described above, because the various EHT PPDUs may be used in the IEEE standard (that is, 802.11be) and the fields of the preambles and the payloads of the EHT PPDUs may be formed as described above, an embodiment of the inventive concept may be implemented in the signaling fields (for example, the U-SIG field and the EHT-SIG field) of the above-described various EHT PPDUs.

That is, because the method of allocating the multiple RU (that is, a method of forming a signaling field for multiple RU allocation) according to an embodiment of the inventive concept may be applied to both the signaling field of the HE PPDU and the signaling field of the EHT PPDU, hereinafter, with reference to FIGS. 18 to 26, the method of allocating the multiple RU according to an embodiment of the inventive concept will be described.

Figure 18:
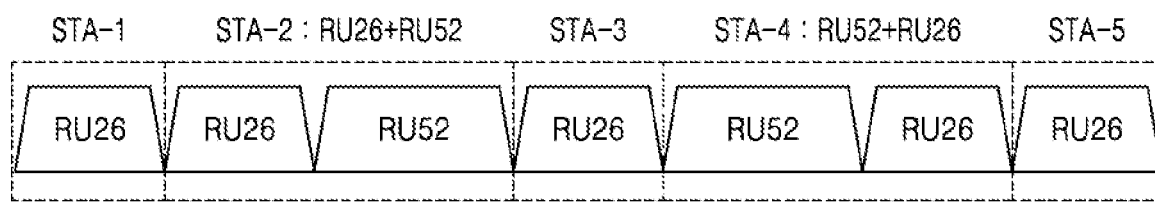
FIG. 18 is a view illustrating an example in which multiple RUs are allocated for stations (STA) in the 20 MHz OFDMA PPDU formed of small-size RUs.
Figure 19:
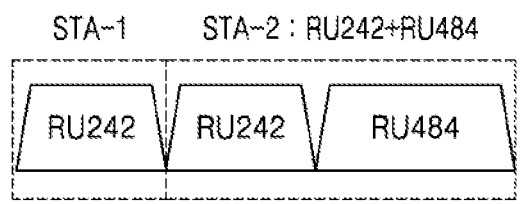
FIG. 19 is a view illustrating an example in which a multiple RU is allocated for an STA in the 80 MHz OFDMA PPDU formed of large-size RUs.

FIG. 18 is a view illustrating an example in which multiple RUs are allocated for STAs in the 20 MHz OFDMA PPDU formed of small-size RUs. FIG. 19 is a view illustrating an example in which a multiple RU is allocated for an STA in the 80 MHz OFDMA PPDU formed of large-size RUs. FIG. 20 is a table illustrating conventional RU arrangement indexing. FIGS. 21 to 23 are tables illustrating the RU arrangement indexing according to an embodiment of the inventive concept. FIGS. 24A to 26D are views illustrating examples in which RU allocation information is formed according to an embodiment of the inventive concept.

For example, it is premised that a method of forming signaling fields of a PPDU, which will be described later, may be applied to both the HE PPDU and the EHT PPDU.

It is premised that an RU may include one single RU among a 26-subcarrier RU, a 52-subcarrier RU, a 106-subcarrier RU, a 242-subcarrier RU, a 484-subcarrier RU, and a 996-subcarrier RU or one multiple RU among a 26+52-subcarrier RU (a multiple RU of RU26+RU52), a 52+26-subcarrier RU (a multiple RU of RU52+RU26), a 26+106-subcarrier RU (a multiple RU of RU26+RU106), a 106+26-subcarrier RU (a multiple RU of RU106+RU26), a 484+242-subcarrier RU (a multiple RU of RU484+RU242), and a 484+996-subcarrier RU (a multiple RU of RU484+RU996).

First, referring to FIGS. 18 and 19, an example in which multiple RUs are allocated for STAs in the 20 MHz OFDMA PPDU formed of the small-size RUs and an example in which a multiple RU is allocated for an STA in the 80 MHz OFDMA PPDU formed of the large-size RUs are illustrated.

For example, for efficiency of multiple RU allocation, RUs may be divided into the small-size RUs and the large-size RUs in accordance with sizes of the RUs.

Here, a small-size RU may be one among the 26-subcarrier RU, the 52-subcarrier RU, and the 106-subcarrier RU and a large-size RU may be one among the 242-subcarrier RU, the 484-subcarrier RU, and the 996-subcarrier RU.

On the other hand, in a conventional art, when seven RUs are arranged in the 20 MHz OFDMA PPDU, one RU is allocated for each of seven STAs so that each STA receives data from an AP.

However, in an embodiment of the inventive concept, through a multiple RU allocation method, a plurality of RUs (that is, multiple RUs) are allocated for a specific STA so that the STA may receive data from an AP.

Therefore, as illustrated in FIG. 18 (a small-size RU case), a multiple RU, RU26+RU52 (the 26-subcarrier RU+the 52-subcarrier RU) is allocated for an STA-2 so that the STA-2 may receive data from the AP. Further, a multiple RU, RU52+RU26 (the 52-subcarrier RU+the 26-subcarrier RU) is allocated for an STA-4 so that the STA-4 may receive data from the AP. One RU is allocated for remaining STAs (that is, an STA-1, an STA-3, and an STA-5) so that the STA-1, the STA-3, and the STA-5 may receive data from the AP.

In addition, as illustrated in FIG. 19 (a large-size RU case), RU242+RU484 (that is, the 242-subcarrier RU+the 484-subcarrier RU), which is a multiple RU is allocated for an STA-2 so that the STA-2 may receive data from the AP. As in a conventional art, one RU is allocated for a remaining STA (that is, an STA-1) so that the STA-1 may receive data from the AP.

As described above, when the STA receives data through the multiple RU, the corresponding STA needs to know which multiple RU is allocated therefor through the signaling field. Therefore, according to an embodiment of the inventive concept, a method of forming a signaling field indicating information on the multiple RU allocated for the STA is provided. The method will be described in detail with reference to FIGS. 20 to 26.

First, referring to FIG. 20, a table T1 describing conventional RU arrangement indexing is illustrated and, referring to FIGS. 21 to 23, a table T2 describing RU arrangement indexing according to an embodiment of the inventive concept is illustrated. Therefore, a method of forming a signaling field according to an embodiment of the inventive concept is described with reference to tables T1 and T2.

For example, each of tables T1 and T2 visually illustrates the RU allocation information included in the signaling field (for example, one of the HE-SIG-A field, the HE-SIG-B field, the U-SIG field, and the EHT-SIG field) of the PPDU.

According to an embodiment of the inventive concept, in order to transmit the multiple RU allocation information through the PPDU, an "additional RU allocation subfield" (hereinafter, "second subfield", interchangeably) of N bits (N is a natural number of no less than 1) is newly defined in the signaling field of the PPDU. According to an embodiment of the inventive concept, through a combination of "RU allocation subfield" (hereinafter, "first subfield") of 8 bits, which is provided in an existing signaling field and the additional RU allocation subfield (the second subfield) of N bits, a signaling field forming method capable of indicating the multiple RU allocation information allocated for each STA is provided.

To facilitate understanding, according to an embodiment of the inventive concept, a case in which 'the N bits' are 'two bits' is taken as an example.

For example, when an embodiment of the inventive concept is applied to 802.11be, so that RU allocation signaling in the common field of the EHT-SIG field may cover variously supported RU combinations, a scheme of adding the additional RU allocation subfield of two bits to the RU Allocation subfield in the common field of the EHT-SIG field is implemented in an embodiment of the inventive concept.

In this case, a mapping scheme for RU allocation using the 8-bit RU Allocation subfield in 802.11ax may be reused when only one RU is allocated per one STA. This is because, although multiple RU allocation signaling provided in an embodiment of the inventive concept is related to 802.11be, the same logic as 802.11ax may be shared so that logic of the non-AP STA may be reduced.

To better explain certain concepts disclosed herein, a method of forming the signaling field by the small-size multiple RU and a method of forming the signaling field by the large-size multiple RU are described. In addition, it is assumed that the small-size multiple RU is formed of a combination of a plurality of continuous RUs and that the large-size multiple RU is formed of a combination of a plurality of continuous or discontinuous RUs.

First, the method of forming the signaling field by the small-size multiple RU will be described with reference to FIGS. 24A and 24B.

RU26+RU52 (a case in which RU26 is arranged in a lower frequency band than RU52), RU52+RU26 (a case in which RU52 is arranged in a lower frequency band than RU26), RU26+RU106 (a case in which RU26 is arranged in a lower frequency band than RU106), or RU106+RU26 (a case in which RU106 is arranged in a lower frequency band than RU26) may be used as the small-size multiple RU.

For instance, according to an embodiment of the inventive concept, the 52-subcarrier RU arranged at at least one end between both ends of the frequency domain (for example, arranged in a #1 or #9 column) may not be "multiple combined" with another RU. (Herein, first and second RUs may be said to be "multiple combined" or just "combined" when they are combined to form a multiple RU.) Or, the 52-subcarrier RU arranged at at least one end between both ends of the frequency domain (for example, arranged in the #1 or #9 column) may be combined with another RU. According to an embodiment of the inventive concept, for convenience sake, it is taken as an example that the 52-subcarrier RU arranged at at least one end between both ends of the frequency domain (for example, arranged in the #1 or #9 column) may not be combined with another RU.

For instance, referring to FIGS. 24A and 24B, a case in which 'RU allocation subfield=6' is illustrated. FIG. 24A is the case illustrated in T1 and FIG. 24B is the case illustrated in table T2.

Referring to FIG. 24A, in a conventional art, when 'RU allocation subfield=6', only one number of entries (that is, RU26, RU26, RU52, RU26, RU52, RU26, and RU26 in seven STAs) may exist. In this case, the multiple RU allocation information may not be displayed through the RU allocation subfield.

For example, when the single RU is one of the 106-subcarrier RU, the 242-subcarrier RU, the 484-subcarrier RU, and the 996-subcarrier RU, a plurality of receiving devices (that is, up to 16 receiving devices) may be allocated for the single RU and, when the single RU is one of the 26-subcarrier RU and the 52-subcarrier RU, only one receiving device may be allocated for the single RU. Therefore, when 'RU allocation subfield=6', one receiving device (for example, the STA) may be allocated for each RU.

However, referring to FIG. 24B, according to an embodiment of the inventive concept, the multiple RU may be defined through the newly added 2-bit 'additional RU allocation subfield'.

Specifically, when 'additional RU allocation subfield=00', a case in which the multiple RU does not exist may be displayed and, when 'additional RU allocation subfield=01', a case in which the multiple RU of RU26+RU52 (that is, 26+52 multi-RU) exists may be displayed. When 'additional RU allocation subfield=10', a case in which the multiple RU of RU52+RU26 (that is, 52+26 multi-RU) exists may be displayed and, when 'additional RU allocation subfield=11', a case in which the multiple RU of RU26+RU52 and the multiple RU of RU52+RU26 simultaneously exist may be displayed.

That is, according to an embodiment of the inventive concept, by adding the 2-bit 'additional RU allocation subfield', the multiple RU allocation case as well as the single RU allocation case displayed in FIG. 24A may be implemented. Accordingly, the examples herein illustrate that the first subfield indicates an arrangement of RUs (e.g., a row of RUs in Tables 1 and 2) in a frequency domain corresponding to the PPDU, and the second subfield indicates a portion of these RUs to be combined to form a multiple RU. For instance, in FIG. 21, the "26+52 multi-RU" is an example of a portion of the RUs defined by the RU Allocation subfield (first subfield) having an entry value "4", in correspondence with the second subfield "01". In this example, the RUs defined by the first subfield of value 4 include RUs #1 to #3 and RUs #5 to #9, where RU #3 is exemplified as a 52 subcarrier RU and RU #2 is exemplified as a 26 subcarrier RU, and therefore RUs #2 and #3 represent a portion of the RUs defined by the first subfield entry "4".

For example, when the multiple RU is one of the 26+106-subcarrier RU, the 106+26-subcarrier RU, the 484+242-subcarrier RU, and the 484+996-subcarrier RU, up to 16 receiving devices may be allocated for the multiple RU and, when the multiple RU is one of the 26+52-subcarrier RU and the 52+26-subcarrier RU, only one receiving device may be allocated for the multiple RU. Therefore, when 'RU allocation subfield=6', one receiving device (for example, the STA) may be allocated for each multiple RU (RU26+RU52 or RU52+RU26).

For example, FIG. 24B is a table created assuming that a center 26-tone RU (RU26 arranged in a #5 column, that is, illustrated in FIG. 12 as the 26-subcarrier RU arranged in the center of the frequency domain) is excluded from an object to be multiple RU combined. That is, the center 26-tone RU may be combined with RU52 arranged to be adjacent thereto and may not form the multiple RU of RU26+RU52 or the multiple RU of RU52+RU26.

When it is assumed that the center 26-tone RU may form the multiple RU, the multiple RU allocation case may be extended by adding the bit number of 'the additional RU allocation subfield' so that the multiple RU may be signaled for the added case.

For convenience sake, according to an embodiment of the inventive concept, the case in which the center 26-tone RU is excluded from the multiple RU combination (that is, the center 26-tone RU may not be combined with the RU52 arranged to be adjacent thereto) is taken as an example.

Referring to FIGS. 25A and 25B, a case in which 'RU allocation subfield=128-191' is illustrated. For example, FIG. 25A is a case illustrated in table T1 and FIG. 25B is a case illustrated in table T2.

Referring to FIG. 25A, in a conventional art, when 'RU allocation subfield=128-191', 64 numbers of entries (e.g., RU106, RU26, and RU106) may exist. In this case, the multiple RU allocation information may not be displayed through the RU allocation subfield.

For instance, '10y2y1y0z2z1z0' is displayed in 'the RU allocation subfield' of FIG. 25A. Here, y2y1y0 means the number of STAs that may be allocated for RU106 arranged in #1 to #4 columns and may be defined as 2^2×y2+2^1×y1+y0+1 (up to eight STAs). In addition, z2z1z0 means the number of STAs that may be allocated for RU106 arranged in #6 to #9 columns and may be defined as 2^×z2+2^×z1+z0+1 (up to eight STAs). Therefore, based on a combination of the maximum number of STAs that may be allocated for RU106 arranged in #1 to #4 columns and the maximum number of STAs that may be allocated for RU106 arranged in #6 to #9 columns, total 64 numbers of entries (the number of indexes 128 to 191 is also 64) may exist.

However, referring to FIG. 25B, according to an embodiment of the inventive concept, the multiple RU may be defined through the newly added 2-bit 'additional RU allocation subfield'.

Specifically, when 'additional RU allocation subfield=00', a case in which the multiple RU does not exist may be displayed and, when 'additional RU allocation subfield=01', a case in which the multiple RU of RU106+RU26 (that is, 106+26 multi-RU) exists may be displayed. When 'additional RU allocation subfield=10', a case in which the multiple RU of RU26+RU106 (that is, 26+106 multi-RU) exists may be displayed and, when 'additional RU allocation subfield=11', reserved may be displayed.

The number of entries per each index (00, 01, 10, or 11) of the second subfield may be 64 on the same principle as described in FIG. 25A.

When the number of RU allocable cases that may be indicated by a combination of eight bits of the first subfield and two bits of the second subfield (for example, the sum of the numbers of cases corresponding to 00, 01, 10, and 11 of the second subfield) is greater than the number of RU allocation cases in specific indexes (for example, 128-191) of the first subfield, among sub-indexes in a specific index (for example, 00, 01, 10, and 11 of 128-191), the sub-index (for example, 11 of 128-191) that needs not be indicated as two bits of the second subfield may be indicated as reserved.

Thus, according to an embodiment of the inventive concept, by adding the 2-bit 'additional RU allocation subfield', the multiple RU allocation case as well as the single RU allocation case displayed in FIG. 25A may be displayed.

As illustrated in FIGS. 24B and 25B, according to an embodiment of the inventive concept, all the small-size multiple RU combinations illustrated in FIGS. 21 to 23 may be displayed through the 2-bit 'additional RU allocation subfield'.

Referring to FIGS. 26A to 26D, a case in which 'RU allocation subfield=80-87' is illustrated.

Referring to FIG. 26A (a case illustrated in table T1), in a conventional art, when 'RU allocation subfield=80-87', eight numbers of entries (that is, RU106, RU26, RU52, RU26, and RU26) may exist. In this case, the multiple RU allocation information may not be displayed through the RU allocation subfield.

For example, because '01010y2y1y0' is displayed in 'the RU allocation subfield' of FIG. 26A, here, y2y1y0 means the number of STAs that may be allocated for RU106 arranged in the #1 to #4 columns and may be defined as 2^×y2+2^×y1+y0+1 (up to eight STAs). Therefore, based on the maximum number of STAs that may be allocated for RU106 arranged in the #1 to #4 columns, a total of eight numbers of entries (the number of indexes 80 to 87 is also 8) may exist.

However, referring to FIG. 26B, the multiple RU may be defined through the newly added 2-bit 'additional RU allocation subfield'.

Specifically, when 'additional RU allocation subfield=00', a case in which the multiple RU does not exist may be displayed and, when 'additional RU allocation subfield=01', a case in which the multiple RU of RU106+RU26 (that is, 106+26 multi-RU) exists may be displayed. When 'additional RU allocation subfield=10', a case in which the multiple RU of RU52+RU26 (that is, 52+26 multi-RU) exists may be displayed and, when 'additional RU allocation subfield=11', a case in which the multiple RU of RU106+RU26 and the multiple RU of RU52+RU26 simultaneously exist may be displayed.

The number of entries per each index (00, 01, 10, or 11) of the second subfield may be 8 on the same principle as described in FIG. 26A.

In FIG. 26A, because the number of STAs that may be allocated for RU106 or RU106+RU26 is 8, 16 STAs may not be allocated for RU106 or RU106+RU26 by the signaling field forming method of FIG. 26B.

Therefore, referring to FIG. 26C, a method of supporting the 16 STAs by adding one bit to 'the RU allocation subfield' is illustrated.

Specifically, '01010y3y2y1y0' is displayed in 'the RU allocation subfield' of FIG. 26C. Here, y3y2y1y0 means the number of STAs that may be allocated for RU106 or RU106+RU26 and may be defined as $2'×y3+2^2×y2+2^×y1+y0+1$ (up to 16 STAs).

That is, more STAs (that is, up to eight to 16 STAs) may be supported by changing a method of forming 'the RU allocation subfield' from a conventional y2y1y0 method to a y3y2y1y0 method obtained by adding one bit to the y3y2y1y0 method.

However, in the method of FIG. 26C, 'the RU allocation subfield' of the conventional PPDU signaling field may not be used as it is and the bit number of 'the RU allocation subfield' increases. Therefore, definition of 'the RU allocation subfield' of the conventional PPDU signaling field is maintained as it is and a method of simultaneously supporting up to 16 STAs is required.

Therefore, referring to FIG. 26D, according to an embodiment of the inventive concept, an RU or multiple RU allocation method of supporting up to 16 STAs through indexes indicated as 'reserved' in 'the RU allocation subfield' and 'the additional RU allocation subfield'.

For example, the indexes '216-223' indicated as 'reserved' in 'the RU allocation subfield' may be used for supporting up to 16 STAs.

Specifically, as illustrated in FIG. 26D, when 'the RU allocation subfield=80-87' and 'additional RU allocation subfield=0y3', a case in which the multiple RU does not exist may be displayed and, when 'the RU allocation subfield=80-87' and 'additional RU allocation subfield=1y3', a case in which the multiple RU of RU106+RU26 (that is, 106+26 multi-RU) exists may be displayed. When 'RU allocation subfield=216-223' and 'the additional RU allocation subfield=0y3', a case in which the multiple RU of RU52+RU26 (that is, 52+26 multi-RU) exists may be displayed and, when 'the RU allocation subfield=216-223' and 'the additional RU allocation subfield=1y3', a case in which the multiple RU of RU106+RU26 and the multiple RU of RU52+RU26 simultaneously exist may be displayed.

For example, when the index of 'the additional RU allocation subfield' is 0y3, a case of (00, 01) may exist and, when the index of 'the additional RU allocation subfield' is 1y3, a case of (10, 11) may exist.

Therefore, when the index of 'the additional RU allocation subfield' is 00 (that is, y3=0), in accordance with a calculation principle of y3y2y1y0, the number of entries for 1 to 8 STAs may be supported and, when the index of 'the additional RU allocation subfield' is 01 (that is, y3=1), in accordance with the calculation principle of y3y2y1y0, the number of entries for 9 to 16 STAs may be supported.

For example, when 'the RU allocation subfield=80-87' and 'the additional RU allocation subfield=00', the 1 to 8 STAs may be allocated for RU106 and, when 'the RU allocation subfield=80-87' and 'the additional RU allocation subfield=00', 9 to 16 STAs may be allocated for RU106. Therefore, total 16 numbers of entries may be displayed.

When 'the RU allocation subfield=216-223' and 'the additional RU allocation subfield=0y3', the same allocation method may be applied.

When the index of 'the additional RU allocation subfield' is 10 (that is, y3=0), in accordance with the calculation principle of y3y2y1y0, the number of entries for 1 to 8 STAs may be supported and, when the index of 'the additional RU allocation subfield' is 11 (that is, y3=1), in accordance with the calculation principle of y3y2y1y0, the number of entries for 9 to 16 STAs may be supported.

For example, when 'the RU allocation subfield=80-87' and 'the additional RU allocation subfield=10', the 1 to 8 STAs may be allocated for the multiple RU of RU106+RU26 and, when 'the RU allocation subfield=80-87' and 'the additional RU allocation subfield=11', 9 to 16 STAs may be allocated for the multiple RU of RU106+RU26. Therefore, total 16 numbers of entries may be displayed.

When 'the RU allocation subfield=216-223' and 'the additional RU allocation subfield=1y3', the same allocation method may be applied.

That is, according to an embodiment of the inventive concept, a combination of eight bits of the first subfield and two bits of the second subfield may indicate 16 as the maximum number of receiving devices that may be allocated for the RU.

As in the case of FIG. 26B, when parts of the numbers of RU allocable cases in a specific index of the first subfield may not be indicated by the combination of the eight bits of the first subfield and the two bits of the second subfield, according to an embodiment of the inventive concept, the non-indicatable part of the numbers of cases may be indicated as the combination of the eight bits of the indexes indicated as reserved in the first subfield and the two bits of the second subfield.

Here, the meaning of 'the indexes indicated as reserved in the first subfield' will be described as follows taking 'the RU allocation subfield=216-223' as an example.

'The RU allocation subfield=216-223' is to be indicated as reserved as displayed in table T1 of FIG. 20. However, according to an embodiment of the inventive concept, as illustrated in FIG. 22, 'the RU allocation subfield=216-223' may be used for auxiliarily displaying parts of the numbers of cases of the '80-87' indexes. That is, 'the indexes indicated as reserved in the first subfield' may mean indexes that are to be indicated as reserved, however, are used for auxiliarily displaying parts of the numbers of cases of other indexes as required.

According to an embodiment of the inventive concept, in the corresponding case, the number of multiplied STAs in the RU (that is, the single RU) or the multiple RU may be displayed as a combination of a reserved value of 'the RU allocation subfield' and 'the additional RU allocation subfield' of one bit.

For instance, 'the additional RU allocation subfield (y3)' of one bit may be used for displaying the number of multiplied STAs in the RU (that is, the single RU) or the multiple RU and the remaining bits of 'the additional RU allocation subfield' may be used for displaying a multiple RU combination.

According to an embodiment of the inventive concept, operations for forming the signaling field by the small-size multiple RU are implemented by the above-described method. Below, a method of forming the signaling field by the large-size multiple RU by using the table T2 illustrated in FIGS. 21 to 23 will be described.

In the large-size multiple RU, RU484+RU242 (including both a case in which RU484 is arranged in a lower frequency band than RU242 and a case in which RU484 is arranged in a higher frequency band than RU242) and RU484+RU996 (a case in which RU484 is arranged in a lower frequency band than RU996 and a case in which RU484 is arranged in a higher frequency band than RU996) may exist.

Here, referring to FIG. 23, a case in which 'RU allocation subfield=224-239' and a case in which 'RU allocation subfield=240-255' are illustrated.

In a conventional art, as illustrated in table T1 of FIG. 20, when 'RU allocation subfield=224-255', reserved may be displayed.

However, referring to FIG. 23, according to an embodiment of the inventive concept, the large-size multiple RU may be defined through the eight bits of the indexes of 'the RU allocation subfield' indicating reserved in the related art (for example, RU allocation subfield='224-239' and '240-255' and indicated as reserved in table T1 of FIG. 20) and the newly added 2-bit 'additional RU allocation subfield'.

When 'the RU allocation subfield=224-239', the multiple RU allocation case of RU484+RU242 may be displayed.

When 'the additional RU allocation subfield=00', a case in which RU242, RU242, and RU484 are arranged in the order is displayed and a case in which the second RU242 is to be multiple combined with RU484 may be displayed. When 'the additional RU allocation subfield=01', the case in which RU242, RU242, and RU484 are arranged in the order is displayed and a case in which the first RU242 is to be multiple combined with RU484 may be displayed. When 'the additional RU allocation subfield=10', a case in which RU484, RU242, and RU242 are arranged in the order is displayed and the case in which the second RU242 is to be multiple combined with RU484 may be displayed. When 'the additional RU allocation subfield=11', the case in which RU484, RU242, and RU242 are arranged in the order is displayed and the case in which the first RU242 is to be multiple combined with RU484 may be displayed.

On the other hand, when 'the RU allocation subfield=240-255', the multiple RU allocation case of RU484+RU996 may be displayed.

When 'the additional RU allocation subfield=00', a case in which RU484, RU484, and RU996 are arranged in the order is displayed and a case in which the second RU484 is to be multiple combined with RU996 may be displayed. When 'the additional RU allocation subfield=01', the case in which RU484, RU484, and RU996 are arranged in the order is displayed and the case in which the second RU484 is to be multiple combined with RU996 may be displayed. When 'the additional RU allocation subfield=10', a case in which RU996, RU484, and RU484 are arranged in the order is displayed and the case in which the second RU484 is to be multiple combined with RU996 may be displayed. When 'the additional RU allocation subfield=11', the case in which RU996, RU484, and RU484 are arranged in the order is displayed and a case in which the first RU484 is to be multiple combined with RU996 may be displayed.

According to an embodiment of the inventive concept, in the above-described two cases, the number of multiplied STAs in the RU (that is, the single RU) or the multiple RU may be displayed only by the reserved value of 'the RU allocation subfield'. In the corresponding cases, 'the additional RU allocation subfield' of two bits may be used for displaying the multiple RU combination.

For example, '1110y3y2y1y0' is displayed in 'the RU allocation subfield=224-239' of FIG. 23. Here, y3y2y1y0 means the number of STAs that may be allocated for the multiple RU of RU484+RU242 and may be defined as $2^3 \times y3 + 2^2 \times y2 + 2^\wedge \times y1 + y0 + 1$ (up to 16 STAs).

Therefore, the number of cases per each index (00, 01, 10, or 11) of the second subfield of 'the RU allocation subfield=224-239' may be 16.

In addition, '1111y3y2y1y0' is displayed in 'the RU allocation subfield=240-255' of FIG. 23. Here, y3y2y1y0 means the number of STAs that may be allocated for the multiple RU of RU484+RU996 and may be defined as $2^3 \times y3 + 2^2 \times y2 + 2^\wedge \times y1 + y0 + 1$ (up to 16 STAs).

Therefore, the number of cases per each index (00, 01, 10, or 11) of the second subfield of 'the RU allocation subfield=224-239' may be 16.

For example, 'the RU allocation subfield' signals information on RU allocation to each sub-channel corresponding to 20 MHz. The 'RU allocation subfield' may set the RU allocation information in units of 20 MHz sub-channels.

Therefore, to signal the multiple RU of RU484+RU242 of the multiple RU of RU484+RU996 through 'the RU allocation subfield'+'the additional RU allocation subfield', indexes of 'the RU allocation subfield'+'the additional RU allocation subfield' are to be set so that the multiple RU is allocated over a plurality of 20 MHz sub-channels.

For example, to signal the multiple RU of RU484+RU242, an entry (that is, an index) indicating that 242-tone RU of a specific 20 MHz sub-channel (that is, 242-subcarrier RU) is used for the multiple RU of RU484+RU242 (that is, 484+242-subcarrier RU) is to be added. Therefore, the corresponding entry may be added by using the reserved value of 'the RU allocation subfield'.

Specifically, the indexes of 'the RU allocation subfield' and 'the additional RU allocation subfield' indicating 20 MHz at which the multiple RU of RU484+RU242 or the multiple RU of RU484+RU996 starts first may be set as illustrated in FIG. 23 (for example, 'the RU allocation subfield=224-239'+'the additional RU allocation subfield=00/01/10/11' or 'the RU allocation subfield=240-255'+'the additional RU Allocation subfield=00/01/10/11'). According to an embodiment of the inventive concept, because the index indicated as reserved in 'the RU allocation subfield' in the related art (for example, 'the RU allocation subfield=116 or 117' of FIG. 20) is used as the index indicating the 20 MHz sub-channel used for the multiple RU of 484+242 or the multiple RU of 484+996 (for example, 'the RU allocation subfield=116' or 'the RU allocation subfield=117' of FIG. 23), the multiple RU of RU484+RU242 or the multiple RU of RU484+RU996 may be allocated for 20 MHz sub-channels provided after the first 20 MHz at which the multiple RU of RU484+RU242 or the multiple RU of RU484+RU996 starts.

For example, when 'the RU allocation subfield=224' and 'the additional RU allocation subfield=10', the case in which RU484, RU242, and RU242 are arranged in the order is displayed and the case in which the second RU242 is to be multiple combined with RU484 may be displayed.

That is, indexes related to the multiple RU are set in RU484 and the second RU242 (the first, second, and fourth sub-channels) and a separate index may be independently set in the first RU242 (the third sub-channel).

Specifically, 'the RU allocation subfield=224' and 'the additional RU allocation subfield=10' may be set in the first 20 MHz sub-channel at which the multiple RU of RU484+RU242 starts. In the second sub-channel provided next to the first 20 MHz sub-channel, 'the RU allocation subfield=116' and 'the additional RU allocation subfield=00' are set and, in the fourth sub-channel, 'the RU allocation subfield=116' and 'the additional RU allocation subfield=00' may be set.

Because the third sub-channel between the second sub-channel and the fourth sub-channel is not the multiple RU of RU484+RU242, a separate RU from the multiple RU of RU484+RU242 may be independently allocated for the third sub-channel. For example, in the third sub-channel, 'the RU allocation subfield=113' and 'the additional RU allocation subfield=00' may be set (when the STA is not allocated), 'the RU allocation subfield=192' and 'the additional RU allocation subfield=00' may be set (when an STA different from that of the multiple RU of RU484+RU242 is allocated), or other indexes may be set. On the other hand, except the above-described method, another method of signaling the multiple RU of RU484+RU242 or the multiple RU of RU484+RU996 through 'the RU allocation subfield'+' the additional RU allocation subfield' may exist.

Specifically, when 'the RU allocation subfield'+'the additional RU allocation subfield' are set as indexes indicated as 'the RU allocation subfield=113'+'the additional RU allocation subfield=00' or reserved (for example, 'the RU allocation subfield=113'+' the additional RU allocation subfield=01/10/11'), it may be grasped whether the corresponding 20 MHz sub-channel is used for the multiple RU of RU484+RU242 or the multiple RU of RU484+RU996.

Specifically, when 'the RU allocation subfield'+'the additional RU allocation subfield' of the current 20 MHz sub-channel are set as indexes corresponding to '113'+'00' or reserved, a work of determining whether the indexes of 'the RU allocation subfield'+'the additional RU allocation subfield' corresponding to the large-size multiple RU exist in the 20 MHz sub-channel arranged immediately before the corresponding sub-channel (that is, arranged in a lower band) may be previously performed. When it is determined that the indexes of 'the RU allocation subfield'+'the additional RU allocation subfield' corresponding to the large-size multiple RU exist, based on the corresponding 20 MHz sub-channel, a required 20 MHz sub-channel is calculated and, based on the calculation result, it may be determined whether the current 20 MHz sub-channel is allocated for the multiple RU of RU484+RU242 or the multiple RU of RU484+RU996.

In a state in which 'the RU allocation subfield'+'the additional RU allocation subfield' of the current 20 MHz are set as the indexes corresponding to '113'+'00' or reserved, when it is determined that the indexes of 'the RU allocation subfield'+'the additional RU allocation subfield' corresponding to the large-size multiple RU do not exist immediately before the corresponding sub-channel, any STA may not be allocated for the RU of the current 20 MHz sub-channel.

For example, in a state in which 'the RU allocation subfield'+'the additional RU allocation subfield' of the current 20 MHz sub-channel are set as the indexes corresponding to '113'+'00' or reserved, when it is determined that the indexes of 'the RU allocation subfield' +'the additional RU allocation subfield' of the 20 MHz sub-channel arranged immediately before the corresponding sub-channel are '224'+'10', it may be determined that the current 20 MHz sub-channel is the second sub-channel of RU484 in RU484+RU242.

On the other hand, for example, in the state in which 'the RU allocation subfield'+'the additional RU allocation subfield' of the current 20 MHz sub-channel are set as the indexes corresponding to '113'+'00' or reserved, when it is determined that the indexes of 'the RU allocation subfield'+'the additional RU allocation subfield' of the 20 MHz sub-channel arranged immediately before the corresponding sub-channel are '112'+'00', any STA may not be allocated for the RU of the current 20 MHz sub-channel.

As described above, according to an embodiment of the inventive concept, the large-size multiple RU may be defined through eight bits of the index of 'the RU allocation subfield' indicating reserved in the related art and the newly added 2-bit 'additional RU allocation subfield'.

That is, according to an embodiment of the inventive concept, through the reserved value of 'the RU allocation subfield' and the 2-bit 'additional RU allocation subfield', all the large-size multiple RU combinations illustrated in FIGS. 21 to 23 may be displayed.

As described above, according to an embodiment of the inventive concept, the above-described method of forming the signaling field by the large-size multiple RU is used.

Below, with reference to FIGS. 27 and 28, a wireless communication method in the WLAN system will be described.

Figure 27:
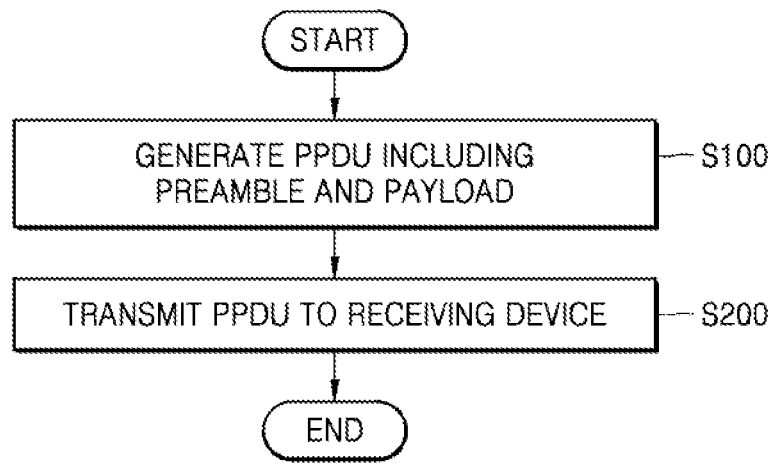
FIG. 27 is a flowchart illustrating a wireless communication method of a transmission device allocating an RU for a receiving device in the WLAN system.

FIG. 27 is a flowchart illustrating a wireless communication method of a transmission device allocating an RU for a receiving device in the WLAN system. FIG. 28 is a flowchart illustrating a wireless communication method of the receiving device receiving the RU from the transmission device in the WLAN system.

Referring to FIGS. 2 and 27, the wireless communication method of the transmission device allocating the RU for the receiving device in the WLAN system is illustrated. Therefore, it is assumed that the wireless communication device 1100 of FIG. 2 is the transmission device (for example, the AP).

First, a PPDU including a preamble and a payload is generated in operation S100.

Specifically, the transceiver 1140 may generate the PPDU including the preamble and the payload by using the PPDU format and the multiple RU allocation information stored in the memory 1120.

Here, the PPDU may be one of the HE PPDU and the EHT PPDU. In addition, the preamble may include the plurality of training fields and the plurality of signaling fields and the payload may include the data field and the packet extension field.

In one of the plurality of signaling fields (for example, one of the HE-SIG-A field, the HE-SIG-B field, the U-SIG field, and the EHT-SIG field), RU allocation information on at least one receiving device (for example, the STA) may be included.

Here, the RU allocation information may include the first subfield indicating an arrangement of the RU in the frequency domain corresponding to the PPDU ('the RU allocation subfield' illustrated in FIGS. 21 to 23) and the second subfield indicating the RU to be multiple combined ('the additional RU allocation subfield' illustrated in FIGS. 21 to 23).

The transceiver 1140 may generate the PPDU by forming the signaling field of the preamble in accordance with the method of forming the signaling field according to an embodiment of the inventive concept (that is, the method of forming the signaling field described in FIGS. 21 to 26D).

When the PPDU is generated in operation S100, the generated PPDU is transmitted to at least one receiving device in operation S200.

Specifically, the transceiver 1140 may transmit the generated PPDU to at least one external receiving device (for example, the STA) through the antenna arrays 1101 to 1104.

Therefore, the at least one external receiving device (for example, the STA) may use the RU allocated therefor based on the PPDU received from the transmission device (for example, the AP).

For example, the single RU or the multiple RU may be allocated for the at least one external receiving device.

Figure 28:
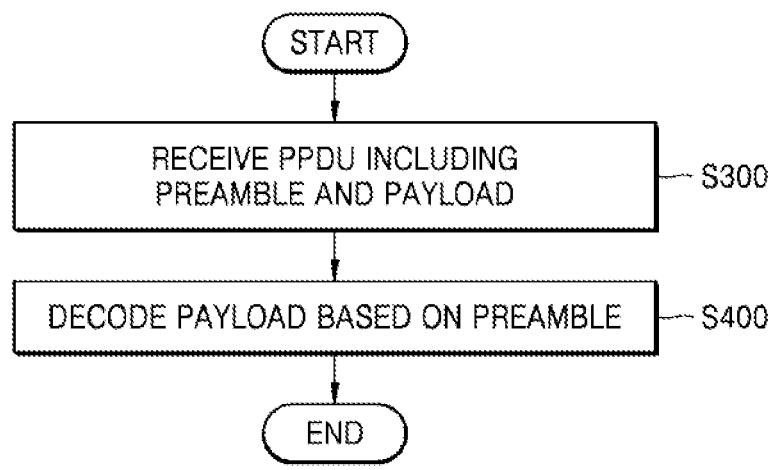
FIG. 28 is a flowchart illustrating a wireless communication method of the receiving device receiving the RU from the transmission device in the WLAN system.

Referring to FIGS. 2 and 28, the wireless communication method of the receiving device receiving the RU from the transmission device in the WLAN system is illustrated. Therefore, it is assumed that the wireless communication device 1100 of FIG. 2 is the receiving device (for example, the STA).

First, the PPDU including the preamble and the payload is received in operation S300.

Specifically, the transceiver 1140 may receive the PPDU from the external transmission device (for example, the AP) through the antenna arrays 1101 to 1104.

Here, the PPDU may be one of the HE PPDU and the EHT PPDU. In addition, the preamble may include the plurality of training fields and the plurality of signaling fields and the payload may include the data field and the PE field.

In one of the plurality of signaling fields (for example, one of the HE-SIG-A field, the HE-SIG-B field, the U-SIG field, and the EHT-SIG field), the RU allocation information on the at least one receiving device (for example, the STA) may be included.

Here, the RU allocation information may include the first subfield indicating an arrangement of the RU in the frequency domain corresponding to the PPDU ('the RU allocation subfield' illustrated in FIGS. 21 to 23) and the second subfield indicating the RU to be multiple combined ('the additional RU allocation subfield' illustrated in FIGS. 21 to 23).

The transceiver 1140 may generate the PPDU by forming the signaling field of the preamble in accordance with the method of forming the signaling field according to an embodiment of the inventive concept (that is, the method of forming the signaling field described in FIGS. 21 to 26D).

When the PPDU is received in operation S300, the payload is decoded based on the preamble in operation S400.

Specifically, the transceiver 1140f may decode the payload based on the preamble of the received PPDU.

Therefore, the receiving device (for example, the STA) may distinguish the RU allocated therefor based on the decoding result and may use the RU for subsequent communication.

As described above, according to an embodiment of the inventive concept, by forming a PPDU that efficiently allocates a multiple RU for a user, spectrum efficiency and a data transmission rate in a physical layer may improve.

While aspects of the inventive concept have been particularly shown and described with reference to embodiments thereof, it will be understood that various changes in form and details may be made therein without departing from the spirit and scope of the inventive concept as defined by the following claims and their equivalents.

What is claimed is:

1. A transmission device of a wireless local area network (WLAN) system, the transmission device comprising:
a transceiver configured to generate a physical layer convergence protocol (PLCP) protocol data unit (PPDU) including a preamble and a payload and to transmit the generated PPDU to at least one receiving device; and
a processor controlling the transceiver,
wherein the preamble comprises a plurality of training fields and a plurality of signaling fields, the plurality of signaling fields including a common field and a plurality of user-specific fields,
wherein resource unit (RU) allocation information for the at least one receiving device is included in the common field, and
wherein the RU allocation information comprises a first subfield indicating an arrangement of RUs and a number of subcarriers of each of the RUs in a frequency domain corresponding to the PPDU and a second subfield indicating a portion of the RUs to be combined to form a multiple RU among the RUs according to the arrangement and the number of subcarriers indicated by the first subfield.

2. The transmission device of claim 1, wherein the payload comprises a data field,
wherein at least one RU is arranged in the frequency domain of the data field based on the RU allocation information, and
wherein the at least one RU comprises one single RU among a 26-subcarrier RU, a 52-subcarrier RU, a 106-subcarrier RU, a 242-subcarrier RU, a 484-subcarrier RU, and a 996-subcarrier RU or one multiple RU among a 26+52-subcarrier RU, a 52+26-subcarrier RU, a 26+106-subcarrier RU, a 106+26-subcarrier RU, a 484+242-subcarrier RU, and a 484+996-subcarrier RU.

3. The transmission device of claim 2, wherein, when the single RU is one of the 106-subcarrier RU, the 242-subcarrier RU, the 484-subcarrier RU, and the 996-subcarrier RU, up to 16 receiving devices are allocable for the single RU, and
wherein, when the single RU is one of the 26-subcarrier RU and the 52-subcarrier RU, one receiving device is allocable for the single RU.

4. The transmission device of claim 2, wherein, when the multiple RU is one of the 26+106-subcarrier RU, the 106+26-subcarrier RU, the 484+242-subcarrier RU, and the 484+996-subcarrier RU, up to 16 receiving devices are allocable for the multiple RU, and
wherein, when the multiple RU is one of the 26+52-subcarrier RU and the 52+26-subcarrier RU, one receiving device is allocable for the multiple RU.

5. The transmission device of claim 2, wherein the single RU or the multiple RU is allocable for the at least one receiving device.

6. The transmission device of claim 2, wherein the first subfield consists of eight bits and the second subfield consists of two bits, and
wherein a combination of eight bits of the first subfield and two bits of the second subfield indicates up to 16 as a maximum number of receiving devices that are allocable for the at least one RU.

7. The transmission device of claim 6, wherein, when a part of a number of RU allocable cases in a specific index of the first subfield is not indicatable by a combination of eight bits of the first subfield and two bits of the second subfield, the non-indicatable part of the number of RU allocable cases is indicated by a combination of eight bits of an index indicated as reserved in the first subfield and two bits of the second subfield.

8. The transmission device of claim 6, wherein, when a number of RU allocable cases that is indicatable by a combination of eight bits of the first subfield and two bits of the second subfield is greater than the number of RU allocable cases in a specific index of the first subfield, a sub-index that need not be indicated by two bits of the second subfield among sub-indexes in the specific index is indicated as reserved.

9. The transmission device of claim 2, wherein a 52-subcarrier RU arranged at at least one end of both ends of the frequency domain is not multiple combined with another RU.

10. The transmission device of claim 2, wherein, in the single RU, the 26-subcarrier RU, the 52-subcarrier RU, and the 106-subcarrier RU are small-size RUs, and
wherein, in the single RU, the 242-subcarrier RU, the 484-subcarrier RU, and the 996-subcarrier RU are large-size RUs.

11. The transmission device of claim 10, wherein, in the multiple RU, the 26+52-subcarrier RU, the 52+26-subcarrier RU, the 26+106-subcarrier RU, and the 106+26-subcarrier RU are small-size multiple RUs, and wherein, in the multiple RU, the 484+242-subcarrier RU and the 484+996-subcarrier RU are large-size multiple RUs.

12. The transmission device of claim 1, wherein a single RU or a multiple RU is allocable for the at least one receiving device.

13. The transmission device of claim 1, wherein the first subfield consists of eight bits and the second subfield consists of two bits, and
wherein a combination of eight bits of the first subfield and two bits of the second subfield indicates up to 16 as a maximum number of receiving devices that are allocable for at least one RU.

14. A transmission device of a wireless local area network (WLAN) system, the transmission device comprising:
a transceiver configured to generate a physical layer convergence protocol (PLCP) protocol data unit (PPDU) including a preamble and a payload and to transmit the generated PPDU to at least one receiving device; and
a processor controlling the transceiver,
wherein,
the preamble comprises a plurality of training fields and a plurality of signaling fields,
resource unit (RU) allocation information for the at least one receiving device is included in one of the plurality of signaling fields, and
the RU allocation information comprises a first subfield indicating an arrangement of RUs in a frequency domain corresponding to the PPDU and a second subfield indicating a portion of the RUs to be combined to form a multiple RU,
the first subfield consists of eight bits and the second subfield consists of two bits,
a combination of eight bits of the first subfield and two bits of the second subfield indicates up to 16 as a maximum number of receiving devices that are allocable for the RU,
when a part of a number of RU allocable cases in a specific index of the first subfield is not indicatable by a combination of eight bits of the first subfield and two bits of the second subfield, the non-indicatable part of the number of RU allocable cases is indicated by a combination of eight bits of an index indicated as reserved in the first subfield and two bits of the second subfield.

15. The transmission device of claim 13, wherein, when a number of RU allocable cases that is indicatable by a combination of eight bits of the first subfield and two bits of the second subfield is greater than the number of RU allocable cases in a specific index of the first subfield,
a sub-index that need not be indicated by two bits of the second subfield among sub-indexes in the specific index is indicated as reserved.

16. A receiving device of a wireless local area network (WLAN) system, the receiving device comprising:
a transceiver configured to receive a physical layer convergence protocol (PLCP) protocol data unit (PPDU) including a preamble and a payload and to decode the payload based on the preamble; and
a processor controlling the transceiver,
wherein the preamble comprises a plurality of training fields and a plurality of signaling fields,
wherein resource unit (RU) allocation information for at least the receiving device is included in a common field of one of the plurality of signaling fields, and
wherein the RU allocation information comprises a first subfield indicating an arrangement of RUs and a number of subcarriers of each of the RUs in a frequency domain corresponding to the PPDU and a second subfield indicating a portion of the RUs to be combined to form a multiple RU among the RUs according to the arrangement and the number of subcarriers indicated by the first subfield.

17. The receiving device of claim 16, wherein the payload comprises a data field,
wherein at least one RU is arranged in the frequency domain of the data field based on the RU allocation information, and
wherein the RU comprises one single RU among a 26-subcarrier RU, a 52-subcarrier RU, a 106-subcarrier RU, a 242-subcarrier RU, a 484-subcarrier RU, and a 996-subcarrier RU or one multiple RU among a 26+52-subcarrier RU, a 52+26-subcarrier RU, a 26+106-subcarrier RU, a 106+26-subcarrier RU, a 484+242-subcarrier RU, and a 484+996-subcarrier RU.

18. The receiving device of claim 17, wherein, when the single RU is one of the 106-subcarrier RU, the 242-subcarrier RU, the 484-subcarrier RU, and the 996-subcarrier RU, up to 16 receiving devices are allocable for the single RU, and
wherein, when the single RU is one of the 26-subcarrier RU and the 52-subcarrier RU, one receiving device is allocable for the single RU.

19. The receiving device of claim 17, wherein, when the multiple RU is one of the 26+106-subcarrier RU, the 106+26-subcarrier RU, the 484+242-subcarrier RU, and the 484+996-subcarrier RU, up to 16 receiving devices are allocable for the multiple RU, and
wherein, when the multiple RU is one of the 26+52-subcarrier RU and the 52+26-subcarrier RU, one receiving device is allocable for the multiple RU.

20. The receiving device of claim 17, wherein the single RU or the multiple RU is allocable for the receiving device.

\* \* \* \* \*